United States Patent
Lim et al.

(10) Patent No.: US 10,798,391 B2
(45) Date of Patent: Oct. 6, 2020

(54) FILTERING METHOD, MOVING PICTURE CODING APPARATUS, MOVING PICTURE DECODING APPARATUS, AND MOVING PICTURE CODING AND DECODING APPARATUS

(71) Applicant: Tagivan II LLC, Chevy Chase, MD (US)

(72) Inventors: Chong Soon Lim, Singapore (SG); Viktor Wahadaniah, Singapore (SG); Sue Mon Thet Naing, San Jose, CA (US); Takahiro Nishi, Nara (JP); Youji Shibahara, Tokyo (JP); Hisao Sasai, Osaka (JP); Toshiyasu Sugio, Osaka (JP)

(73) Assignee: TAGIVAN II LLC, Chevy Chase, MD (US)

( * ) Notice: Subject to any disclaimer, the term of this patent is extended or adjusted under 35 U.S.C. 154(b) by 0 days.

(21) Appl. No.: 16/677,014

(22) Filed: Nov. 7, 2019

(65) Prior Publication Data
US 2020/0077101 A1     Mar. 5, 2020

Related U.S. Application Data

(60) Continuation of application No. 15/966,403, filed on Apr. 30, 2018, now Pat. No. 10,511,844, which is a
(Continued)

(51) Int. Cl.
*H04N 19/176* (2014.01)
*H04N 19/593* (2014.01)
(Continued)

(52) U.S. Cl.
CPC ......... *H04N 19/176* (2014.11); *H04N 19/117* (2014.11); *H04N 19/157* (2014.11);
(Continued)

(58) Field of Classification Search
CPC .. H04N 19/176; H04N 19/593; H04N 19/117; H04N 19/157; H04N 19/82; H04N 19/86; H04N 19/60; H04N 19/124
See application file for complete search history.

(56) References Cited

U.S. PATENT DOCUMENTS

| 4,557,596 A | 12/1985 | Müller et al. |
| 5,178,418 A | 1/1993 | Merry et al. |

(Continued)

FOREIGN PATENT DOCUMENTS

| AU | 2012206186 | 7/2012 |
| CN | 1812580 | 8/2006 |

(Continued)

OTHER PUBLICATIONS

"Information technology—Coding of audio-visual objects—Part 10: Advanced Video Coding", ISO/IEC 14496-10, Second 2004, pp. 1-267.
(Continued)

*Primary Examiner* — Marnie A Matt
(74) *Attorney, Agent, or Firm* — Wenderoth, Lind, & Ponack, L.L.P.

(57) ABSTRACT

A filtering method according to the present invention is for filtering a plurality of blocks included in an image, and comprises: determining whether each of the blocks is an IPCM block or not; filtering a non-IPCM block that is not an IPCM block among the blocks to generate filtered data; outputting the filtered data as pixel values of the non-IPCM block, and outputting pixel values of the unfiltered IPCM block as pixel values of the IPCM block.

3 Claims, 32 Drawing Sheets

Related U.S. Application Data continuation of application No. 15/618,757, filed on Jun. 9, 2017, now Pat. No. 10,015,498, which is a continuation of application No. 14/134,812, filed on Dec. 19, 2013, now Pat. No. 9,729,874, which is a division of application No. 13/400,896, filed on Feb. 21, 2012, now Pat. No. 9,826,230.

(60) Provisional application No. 61/445,115, filed on Feb. 22, 2011.

(51) Int. Cl.
    *H04N 19/117*      (2014.01)
    *H04N 19/157*      (2014.01)
    *H04N 19/82*      (2014.01)
    *H04N 19/86*      (2014.01)

(52) U.S. Cl.
    CPC .......... *H04N 19/593* (2014.11); *H04N 19/82* (2014.11); *H04N 19/86* (2014.11)

(56) References Cited

U.S. PATENT DOCUMENTS

| | | | |
|---|---|---|---|
| 5,772,249 A | 6/1998 | Guex et al. | |
| 6,104,812 A | 8/2000 | Koltai et al. | |
| 6,377,706 B1 | 4/2002 | de Queiroz | |
| 6,473,516 B1 | 10/2002 | Kawaguchi et al. | |
| 6,692,030 B1 | 2/2004 | Phillips | |
| 6,967,665 B2 | 11/2005 | Ishikawa et al. | |
| 7,095,787 B2 | 8/2006 | Kadono et al. | |
| 7,190,289 B2 | 3/2007 | Kobayashi et al. | |
| 7,298,303 B2 | 11/2007 | Kobayashi et al. | |
| 7,372,905 B2 | 5/2008 | Foo et al. | |
| 7,394,853 B2 | 7/2008 | Kondo et al. | |
| 7,650,032 B2 | 1/2010 | Abe et al. | |
| 7,742,531 B2 | 6/2010 | Xue et al. | |
| 7,782,962 B2 | 8/2010 | Xue et al. | |
| 7,782,963 B2 | 8/2010 | Foo et al. | |
| 7,792,195 B2 | 9/2010 | Xue et al. | |
| 7,809,060 B2 | 10/2010 | Toma et al. | |
| 7,843,994 B2 | 11/2010 | Toma et al. | |
| 7,899,123 B2 | 3/2011 | Xue et al. | |
| 7,978,225 B2 | 7/2011 | Tabuchi et al. | |
| 8,085,856 B2 | 12/2011 | Foo et al. | |
| 8,116,384 B2 | 2/2012 | Foo et al. | |
| 8,130,843 B2 | 3/2012 | Toma et al. | |
| 8,155,200 B2 | 4/2012 | Kondo et al. | |
| 8,155,201 B2 | 4/2012 | Kondo et al. | |
| 8,160,147 B2 | 4/2012 | Kondo et al. | |
| 8,179,968 B2 | 5/2012 | Kondo et al. | |
| 8,194,745 B2 | 6/2012 | Kondo et al. | |
| 8,213,510 B2 | 7/2012 | Kondo et al. | |
| 8,254,446 B2 | 8/2012 | Toma et al. | |
| 8,254,447 B2 | 8/2012 | Toma et al. | |
| 8,254,468 B2 | 8/2012 | Xue et al. | |
| 8,259,818 B2 | 9/2012 | Hsu et al. | |
| 8,345,753 B2 | 1/2013 | Lee et al. | |
| 8,345,770 B2 | 1/2013 | Xue et al. | |
| 8,369,421 B2 | 2/2013 | Kadono et al. | |
| 8,396,307 B2 | 3/2013 | Nakagami et al. | |
| 8,488,683 B2 | 7/2013 | Xue et al. | |
| 8,542,750 B2 | 9/2013 | Cha et al. | |
| 8,606,028 B2 | 12/2013 | Noda et al. | |
| 8,625,914 B2 | 1/2014 | Nakagami et al. | |
| 8,665,961 B2 | 3/2014 | Kondo et al. | |
| 8,737,751 B2 | 5/2014 | Sato | |
| 8,817,873 B2 | 8/2014 | Saigo et al. | |
| 8,923,637 B2 | 12/2014 | Nakagami et al. | |
| 8,948,254 B2 | 2/2015 | Nakajima et al. | |
| 9,020,034 B2 | 4/2015 | Kondo et al. | |
| 9,020,035 B2 | 4/2015 | Kondo et al. | |
| 9,020,036 B2 | 4/2015 | Kondo et al. | |
| 9,020,037 B2 | 4/2015 | Kondo et al. | |
| 9,031,132 B2 | 5/2015 | Kondo et al. | |
| 9,118,930 B2 | 8/2015 | Kondo et al. | |
| 9,270,987 B2 | 2/2016 | Sato | |
| 9,961,352 B2 | 5/2018 | Lim et al. | |
| 2002/0150159 A1 | 10/2002 | Zhong et al. | |
| 2004/0007145 A1 | 1/2004 | Franz et al. | |
| 2004/0062310 A1 | 4/2004 | Xue et al. | |
| 2004/0066273 A1 | 4/2004 | Cortina et al. | |
| 2004/0076237 A1 | 4/2004 | Kadono et al. | |
| 2004/0126034 A1 | 7/2004 | Yu et al. | |
| 2004/0179620 A1 | 9/2004 | Foo et al. | |
| 2004/0218674 A1 | 11/2004 | Kondo et al. | |
| 2005/0035590 A1 | 2/2005 | Jones et al. | |
| 2005/0117653 A1 | 6/2005 | Sankaran | |
| 2005/0134884 A1 | 6/2005 | Rombola et al. | |
| 2005/0146451 A1 | 7/2005 | Kobayashi et al. | |
| 2005/0201633 A1 | 9/2005 | Moon et al. | |
| 2005/0243914 A1 | 11/2005 | Kwon et al. | |
| 2006/0010264 A1 | 1/2006 | Rader et al. | |
| 2006/0074642 A1 | 4/2006 | You | |
| 2006/0082596 A1 | 4/2006 | Karlov et al. | |
| 2006/0126744 A1* | 6/2006 | Peng | H04N 19/70 375/240.26 |
| 2006/0146941 A1* | 7/2006 | Cha | H04N 19/61 375/240.29 |
| 2006/0182436 A1 | 8/2006 | Tabuchi et al. | |
| 2006/0202872 A1 | 9/2006 | Kobayashi et al. | |
| 2006/0239360 A1 | 10/2006 | Kadono et al. | |
| 2006/0285757 A1 | 12/2006 | Abe et al. | |
| 2007/0009044 A1 | 1/2007 | Tourapis et al. | |
| 2007/0016790 A1 | 1/2007 | Brundage et al. | |
| 2007/0063997 A1 | 3/2007 | Scherer et al. | |
| 2007/0092002 A1 | 4/2007 | Xue et al. | |
| 2007/0098066 A1 | 5/2007 | Xue et al. | |
| 2007/0104269 A1 | 5/2007 | Xue et al. | |
| 2007/0237412 A1 | 10/2007 | Mizuno | |
| 2007/0252838 A1 | 11/2007 | Hains et al. | |
| 2007/0286280 A1 | 12/2007 | Saigo et al. | |
| 2008/0025397 A1* | 1/2008 | Zhao | H04N 19/11 375/240.13 |
| 2008/0031357 A1 | 2/2008 | Kimura | |
| 2008/0049843 A1 | 2/2008 | Kadono et al. | |
| 2008/0056353 A1 | 3/2008 | Xue et al. | |
| 2008/0056602 A1 | 3/2008 | Xue et al. | |
| 2008/0056603 A1 | 3/2008 | Xue et al. | |
| 2008/0063077 A1 | 3/2008 | Kondo et al. | |
| 2008/0063084 A1 | 3/2008 | Xue et al. | |
| 2008/0069236 A1 | 3/2008 | Kondo et al. | |
| 2008/0069237 A1 | 3/2008 | Kondo et al. | |
| 2008/0069238 A1 | 3/2008 | Foo et al. | |
| 2008/0069245 A1 | 3/2008 | Kadono et al. | |
| 2008/0084931 A1 | 4/2008 | Kondo et al. | |
| 2008/0095461 A1 | 4/2008 | Kim et al. | |
| 2008/0117979 A1 | 5/2008 | Kondo et al. | |
| 2008/0117988 A1 | 5/2008 | Toma et al. | |
| 2008/0118218 A1 | 5/2008 | Toma et al. | |
| 2008/0118224 A1 | 5/2008 | Toma et al. | |
| 2008/0130753 A1 | 6/2008 | Foo et al. | |
| 2008/0130761 A1 | 6/2008 | Kadono et al. | |
| 2008/0131079 A1 | 6/2008 | Toma et al. | |
| 2008/0131087 A1 | 6/2008 | Lee et al. | |
| 2008/0219354 A1 | 9/2008 | Segall et al. | |
| 2008/0219393 A1 | 9/2008 | Toma et al. | |
| 2008/0240512 A1 | 10/2008 | Nireki | |
| 2008/0260035 A1 | 10/2008 | Kondo et al. | |
| 2009/0016627 A1 | 1/2009 | Uetani et al. | |
| 2009/0020999 A1 | 1/2009 | Kendrick | |
| 2009/0021000 A1 | 1/2009 | McCartney et al. | |
| 2009/0059304 A1 | 3/2009 | Manfredi et al. | |
| 2009/0087111 A1 | 4/2009 | Noda et al. | |
| 2009/0154557 A1 | 6/2009 | Zhao et al. | |
| 2009/0161761 A1 | 6/2009 | Ramachandran et al. | |
| 2009/0161770 A1 | 6/2009 | Dong et al. | |
| 2009/0175334 A1 | 7/2009 | Ye et al. | |
| 2009/0213930 A1 | 8/2009 | Ye et al. | |
| 2009/0315319 A1 | 12/2009 | Kendrick et al. | |
| 2009/0323826 A1 | 12/2009 | Wu et al. | |
| 2010/0020866 A1 | 1/2010 | Marpe et al. | |
| 2010/0073574 A1 | 3/2010 | Nakajima et al. | |
| 2010/0128786 A1 | 5/2010 | Gao et al. | |

(56) References Cited

U.S. PATENT DOCUMENTS

| | | |
|---|---|---|
| 2010/0142835 A1 | 6/2010 | Nakagami et al. |
| 2010/0142836 A1 | 6/2010 | Joshi et al. |
| 2010/0172416 A1 | 7/2010 | Foo et al. |
| 2010/0172582 A1 | 7/2010 | Ding |
| 2010/0177820 A1 | 7/2010 | Chono et al. |
| 2010/0191538 A1 | 7/2010 | Kovesi et al. |
| 2010/0208827 A1 | 8/2010 | Divorra Escoda et al. |
| 2010/0284466 A1 | 11/2010 | Pandit et al. |
| 2011/0013704 A1 | 1/2011 | Hsu et al. |
| 2011/0103488 A1 | 5/2011 | Xue et al. |
| 2011/0188574 A1 | 8/2011 | Matsuo et al. |
| 2011/0222605 A1 | 9/2011 | Kashiwagi et al. |
| 2012/0057076 A1 | 3/2012 | Foo et al. |
| 2012/0106839 A1 | 5/2012 | Foo et al. |
| 2012/0224774 A1 | 9/2012 | Lim et al. |
| 2012/0275520 A1 | 11/2012 | Kondo et al. |
| 2012/0314965 A1 | 12/2012 | Kashiwagi et al. |
| 2013/0101025 A1 | 4/2013 | Van der Auwera et al. |
| 2013/0101031 A1 | 4/2013 | Van der Auwera et al. |
| 2013/0101037 A1 | 4/2013 | Chono et al. |
| 2013/0156110 A1 | 6/2013 | Nakagami et al. |
| 2013/0195207 A1 | 8/2013 | Xue et al. |
| 2013/0223514 A1 | 8/2013 | Chono et al. |
| 2013/0272623 A1 | 10/2013 | Jeon et al. |
| 2013/0314486 A1 | 11/2013 | Goldau et al. |
| 2013/0315493 A1 | 11/2013 | Sato |
| 2013/0329783 A1 | 12/2013 | Sato |
| 2014/0023136 A1 | 1/2014 | Park et al. |
| 2014/0044172 A1 | 2/2014 | Kondo et al. |
| 2014/0044173 A1 | 2/2014 | Kondo et al. |
| 2014/0044182 A1 | 2/2014 | Kondo et al. |
| 2014/0044183 A1 | 2/2014 | Kondo et al. |
| 2014/0044184 A1 | 2/2014 | Kondo et al. |
| 2014/0044185 A1 | 2/2014 | Kondo et al. |
| 2014/0079137 A1 | 3/2014 | Nakagami et al. |
| 2014/0241422 A1 | 8/2014 | Lee et al. |
| 2015/0078439 A1 | 3/2015 | Nakagami et al. |
| 2016/0134897 A1 | 5/2016 | Sato |
| 2016/0134898 A1 | 5/2016 | Sato |

FOREIGN PATENT DOCUMENTS

| | | |
|---|---|---|
| CN | 100358366 | 12/2007 |
| CN | 101087408 | 12/2007 |
| CN | 101193301 | 6/2008 |
| CN | 101193305 | 6/2008 |
| CN | 101273638 | 9/2008 |
| CN | 101389016 | 3/2009 |
| CN | 100493205 | 5/2009 |
| CN | 101621692 | 1/2010 |
| CN | 102025997 | 4/2011 |
| EP | 1 240 731 | 9/2002 |
| EP | 2 595 379 | 5/2013 |
| EP | 2 665 263 | 11/2013 |
| JP | 2004-180248 | 6/2004 |
| JP | 2010-183368 | 8/2010 |
| JP | 2012-147191 | 8/2012 |
| RU | 2008 138 706 | 4/2010 |
| RU | 2 433 562 | 11/2011 |
| TW | I232682 | 5/2005 |
| TW | 200845723 | 11/2008 |
| TW | 200948076 | 11/2009 |
| TW | 200949824 | 12/2009 |
| TW | I320286 | 2/2010 |
| TW | I323614 | 4/2010 |
| TW | 201105139 | 2/2011 |
| WO | 01/48944 | 7/2001 |
| WO | 2005/010684 | 2/2005 |
| WO | 2009/010674 | 1/2009 |
| WO | 2010/047104 | 4/2010 |
| WO | 2010/125606 | 11/2010 |
| WO | 2012/008130 | 1/2012 |
| WO | 2012/096201 | 7/2012 |
| WO | 2012/114724 | 8/2012 |
| WO | 2012/131474 | 10/2012 |
| WO | 2012/165095 | 12/2012 |

OTHER PUBLICATIONS

International Search Report dated May 22, 2012 in International Application No. PCT/JP2012/001167.
Keiichi Chono et al., "Pulse code modulation mode for HEVC", Joint Collaborative Team on Video Coding (JCT-VC) of ITU-T SG16 WP3 and ISO/IEC JTC1/SC29/WG11, JCTVC-D044-rev1, 4$^{th}$ Meeting: Daegu, Korea, Jan. 2011, pp. 1-9.
Keiichi Chono et al., "Proposal of enhanced PCM coding in HEVC", Joint Collaborative Team on Video Coding (JCT-VC) of ITU-T SG16 WP3 and ISO/IEC JTC1/SC29/WG11, JCTVC-E192-r2, 5$^{th}$ 12 Meeting: Geneva, CH, Mar. 2011, pp. 1-12.
Thomas Wiegand et al., "WD1: Working Draft 1 of High-Efficiency Video Coding", Joint Collaborative Team on Video Coding (JCT-VC) of ITU-T SG16 WP3 and ISO/IEC JTC1/SC29/WG11, JCTVC-C403, Ver. 1, 3$^{rd}$ Meeting: Guangzhou, CN, Oct. 7-15, 2010
ITU-T, H.264, "Series H: Audiovisual and Multimedia Systems—Infrastructure of audiovisual services—Coding of moving video", Mar. 2010.
International Search Report dated May 22, 2012 in International Application No. PCT/JP2012/001168.
International Search Report dated Oct. 9, 2012 in International Application No. PCT/JP2012/004460.
Keiichi Chono et al., "Proposal of enhanced PCM coding in HEVC", Joint Collaborative Team on Video Coding (JCT-VC) of ITU-T SG16 WP3 and ISO/IEC JTC1/SC29/WG11, JCTVC-E192-r2, 5th Meeting: Geneva, CH, Mar. 2011, pp. 1-12.
Anand Kotra et al., "Deblocking bug fix for CU-Varying QP's and IPCM blocks.", Joint Collaborative Team on Video Coding (JCT-VC) of ITU-T SG16 WP3 and ISO/IEC JTC1/SC29/WG11, JCTVC-G640-r3, 7th Meeting: Geneva, CH, Nov. 2011, pp. 1-14.
Geert Van der Auwera et al., AHG6: "Deblocking of IPCM Blocks Containing Reconstructed Samples", Joint Collaborative Team on Video Coding (JCT-VC) of ITU-T SG16 WP3 and ISO/IEC JTC1/SC29/WG11, JCTVC-H0448, 8th Meeting: San Jose, CA, USA, Feb. 2012, pp. 1-6.
Keiichi Chono et al., AHG6: "Report on unified QP derivation process in deblocking of I_PCM regions (draft)", Joint Collaborative Team on Video Coding (JCT-VC) of ITU-T SG16 WP3 and ISO/IEC JTC1/SC29/WG11, JCTVC-I0035-rl, 9th Meeting: Geneva, CH, Apr. 2012, pp. 1-15.
Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, Ver. 8, 5th Meeting: Geneva, CH, Mar. 2011.
Geert Van der Auwera et al., "Deblocking Video of IPCM Blocks Containing Reconstructed Samples", Joint Collaborative Team on Coding (JCT-VC) of ITU-T SG16 WP3 and ISO/IEC JTC1/SC29/WG11, 7th Meeting: Geneva, Nov. 2011, JCTVC-G138-rl, pp. 1-5.
Office Action dated Jun. 13, 2014 in U.S. Appl. No. 13/400,896.
Notice of Allowance dated Apr. 23, 2014 in U.S. Appl. No. 13/551,686.
Office Action with Search Report dated Jan. 7, 2015 in the corresponding Chinese Patent Application No. 201280000774.3, with English translation of Search Report.
Office Action dated Feb. 4, 2015 in U.S. Appl. No. 13/400,896.
Office Action dated Jun. 17, 2015 in U.S. Appl. No. 13/400,896.
Office Action with Search Report dated Aug. 26, 2015 for the corresponding Taiwanese Patent Application No. 101105646 with English translation of the Search Report.
Gary J. Sullivan, "Video Compression-From Concepts to the H.264/AVC Standard" Proceedings of the IEEE, vol. 93, No. 1, pp. 18-31, Jan. 2005.
Extended European Search Report issued for European patent Application No. 12749118.1, dated Dec. 1, 2015.
Aoki, H. et al. "TE2: 1-D DPCM-based memory compression", Joint Collaborative Team on Video Coding (JCT-VC) of ITU-T

(56) References Cited

OTHER PUBLICATIONS

SG16 WP3 and ISO/IEC JTC1/SC29/WG11, JCTVC-C093, 3rd Meeting: Guangzhou, CN, Oct. 7-15, 2010, pp. 1-12, XP30007800.
Keiichi Chono et al., "Proposal of enhanced PCM coding in HEVC", Joint Collaborative Team on Video Coding (JCT-VC) of ITU-T SG16 WP3 and ISO/IEC JTC1/SC29/WG11, JCTVC-E192, 5th Meeting: Geneva, CH, Mar. 16-23, 2011, pp. 1-12, XP30008698.
Extended European Search Report issued for European patent Application No. 12749678.4, dated Dec. 23, 2015.
Lee, J. et al., "Deblocking filter modification for constrained intra prediction", Joint Collaborative Team on Video Coding (JCT-VC) of ITU-T SG16 WP3 and ISO/IEC JTC1/SC29/WG11, JCTVC-F359, 6th Meeting: Torino, IT, Jul. 14-22, 2011, XP030009382.
Geert Van der Auwera et al., "Deblocking of IPCM Blocks Containing Reconstructed Samples", Joint Collaborative Team on Video Coding (JCT-VC) of ITU-T SG16 WP3 and ISO/IEC JTC1/SC29/WG11, 7th Meeting: Geneva, Nov. 2011, JCTVC-G138, XP030050254.
Wiegand, T. et al., "Overview of the H.264/AVC Video Coding Standard", IEEE Transactions on Circuits and Systems for Video Technology, IEEE Service Center, Piscataway, NJ, US, vol. 13, No. 7, Jul. 1, 2003, XP011221093.
List, P. et al., "Adaptive deblocking filter", IEEE Transactions on Circuits and Systems for Video Technology, IEEE Service Center, Piscataway, NJ, US, vol. 13, No. 7, Jul. 1, 2003, XP011221094.
T. Wiegand et al., "WD2: Working Draft 2 of High-Efficiency Video Coding", Joint Collaborative Team on Video Coding (JCT-VC) of ITU-T SG16 WP3 and ISO/IEC JTC1/SC29/WG11, JCTVC-D503; 4th Meeting: Daegu, KR, Jan. 20-28, 2011.
K. Chono et al., "Performance improvement of DPCM-based memory compression by adaptive quantization", Joint Collaborative Team on Video Coding (JCT-VC) of ITU-T SG16 WP3 and ISO/IEC JTC1/SC29/WG11, JCTVC-C095; 3rd Meeting: Guangzhou, CN, Oct. 7-15, 2010
Notice of Allowance with Search Report dated Apr. 27, 2016 in corresponding Taiwanese Patent Application No. 104140789, with English translation.
Patent Examination Report No. 1 dated May 16, 2016 in Australian Application No. 2012221587.
Notice of Allowance dated Jun. 16, 2016 in U.S. Appl. No. 14/451,492.
Office Action dated Aug. 22, 2016 issued for EP Application No. 12749118.1.
Office Action dated Sep. 16, 2016 issued for EP Application No. 12749678.4.
Sun, "Lossless Coding and QP Range Selection", 3. JVT Meeting; 60. MPEG Meeting; May 6, 2002-May 10, 2002; Fairfax, US; (Joint Video Team of ISO/IEC JTC1/SC29/WG11 and ITU-T SG.16),, No. JVT-C023r1-L, May 10, 2002 (May 10, 2002), XP030005129, ISSN:0000-0442.
Joch, "UB Video Comments on Draft Text", 6. JVT Meeting; 63. MPEG Meeting; Dec. 9, 2002-Dec. 13, 2002; Awaji, JP; (Joint Video Team of ISO/IEC JTC1/SC29/WG11 and ITU-T SG.16),, No. JVT-F074-L, Dec. 13, 2002 (Dec. 13, 2002), XP030005642, ISSN:0000-0428.
Office Action dated Jan. 9, 2017 in U.S. Appl. No. 13/400,896.
Notice of Allowance dated Jan. 17, 2017 in U.S. Appl. No. 15/361,128.
Official communication regarding the summons to attend oral proceedings for European Patent Application No. 12749678.4 dated Mar. 31, 2017.
Patent Examination Report No. 2 dated May 8, 2017 in Australian Application No. 2012221587.
Office Action dated Jan. 23, 2015 in U.S. Appl. No. 14/134,812.
Office Action dated Aug. 4, 2016 in U.S. Appl. No. 14/134,812.
Office Action dated Sep. 7, 2017 in U.S. Appl. No. 15/267,234.
Office Action dated Sep. 5, 2017 in U.S. Appl. No. 15/681,470.
Communication pursuant to Article 94(3) EPC dated Jun. 28, 2017 in European Application No. 12 749 118.1.
Communication pursuant to Article 94(3) EPC dated May 19, 2017 in European Application No. 12 814 394.8.
First Examination Report dated Sep. 26, 2017 in Indian Application No. 7418/CHENP/2012.
Office Action dated Jan. 9, 2018 in European Application No. 12 814 394.8.
Office Action dated Jan. 25, 2018 in European Application No. 12 749 118.1.
Office Action dated Jun. 26, 2018 in U.S. Appl. No. 15/936,992.
Office Action dated Jun. 20, 2018 in Canadian Application No. 2,801,215.
Office Action dated Jul. 25, 2018 in European Application No. 12 814 394.8.
Office Action issued for Indian Patent Application No. 974/CHENP/2013 dated Dec. 28, 2018.
Office Action issued for Indian Patent Application No. 9517/CHENP/2013 dated Jan. 24, 2019.
Summons to attend Oral Proceedings mailed on May 13, 2019 in European Application No. 12 814 394.8.
Office Action dated May 31, 2019 in Canadian Application No. 2,801,215.

* cited by examiner

FIG. 21

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 24
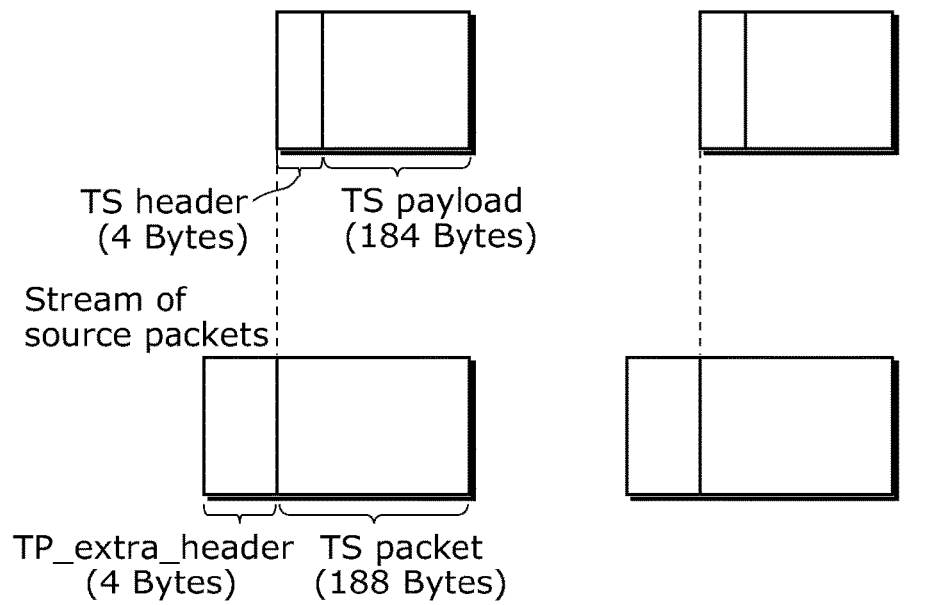
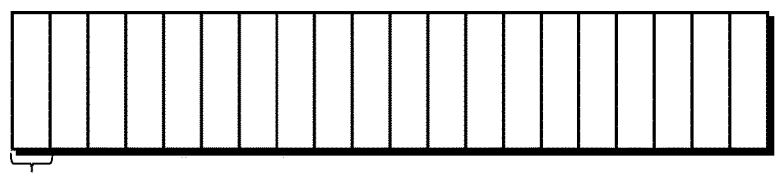
FIG. 25
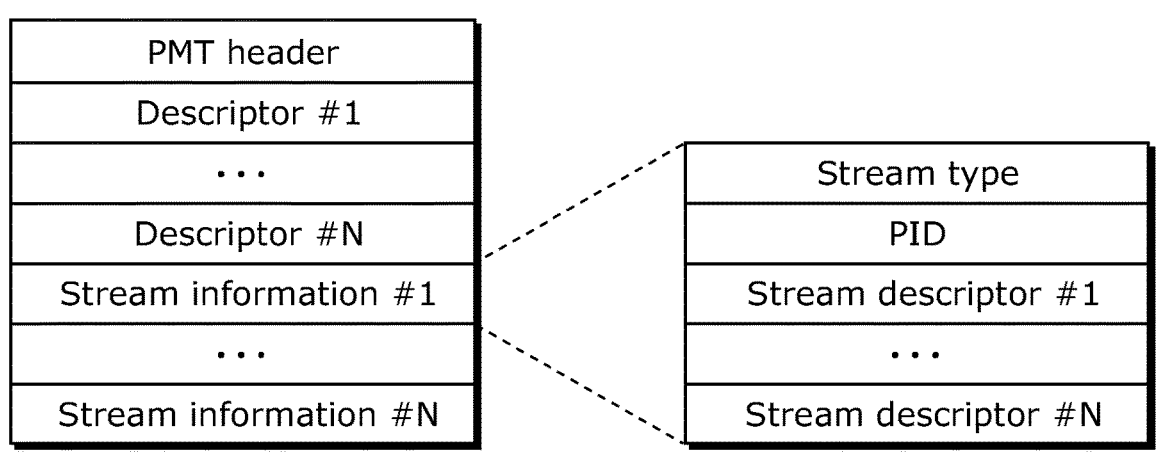

| Corresponding standard | Driving frequency |
|---|---|
| MPEG-4 AVC | 500 MHz |
| MPEG-2 | 350 MHz |
| ⋮ | ⋮ |

FILTERING METHOD, MOVING PICTURE CODING APPARATUS, MOVING PICTURE DECODING APPARATUS, AND MOVING PICTURE CODING AND DECODING APPARATUS

CROSS REFERENCE TO RELATED APPLICATIONS

This application is a continuation of application Ser. No. 15/966,403, filed Apr. 30, 2018, which is a continuation of application Ser. No. 15/618,757, filed Jun. 9, 2017, now U.S. Pat. No. 10,015,498, which is a continuation of application Ser. No. 14/134,812, filed Dec. 19, 2013, now U.S. Pat. No. 9,729,874, which is a divisional of application Ser. No. 13/400,896, filed Feb. 21, 2012, now U.S. Pat. No. 9,826,230, which claims the benefit of U.S. Provisional Application No. 61/445,115, filed Feb. 22, 2011. The entire disclosures of the above-identified applications, including the specification, drawings and claims are incorporated herein by reference in their entirety.

TECHNICAL FIELD

The present invention relates to a filtering method, a moving picture coding apparatus, a moving picture decoding apparatus, and a moving picture coding and decoding apparatus.

BACKGROUND ART

Intra Pulse Code Modulation (IPCM) blocks are blocks of uncompressed video or image samples where luma and chroma samples are coded in the coded stream. These blocks are used in the case when the entropy coding unit produces more bits rather than reduces bits when coding the blocks of image samples.
In other words, the pixel values of the IPCM blocks are not compressed, and thus the raw pixel values of the original image are used. The IPCM block is introduced in the H.264/AVC Video Compression Standard.

When IPCM blocks are coded in a coded stream in the H.264 Video Compression Standard, these IPCM blocks are coded as uncompressed data. No decoding is performed for these blocks. However, post-decoding processing (including filtering such as deblocking filtering) is still performed on the block boundaries which tend to be a cause of deterioration in image quality (for example, see Non-patent Literature (NPL) 1).

CITATION LIST

Non Patent Literature

[NPL 1]
ISO/IEC 14496-10 "MPEG-4 Part 10 Advanced Video Coding"

SUMMARY OF INVENTION

Technical Problem

However, in the aforementioned conventional art, filtering is performed also on the boundary of both kinds of blocks that are an IPCM block and a non-IPCM block. Here, an IPCM block is a block as to which the original pixel values are used. Thus, the conventional art has a problem that the image quality of IPCM blocks deteriorates when filtering is performed.

The present invention aims to provide a filtering method which enables suppression of deterioration in the image quality of IPCM blocks.

Solution to Problem

In order to achieve the aforementioned object, a filtering method according to an aspect of the present invention is for filtering a plurality of blocks included in an image, the filtering method comprising: determining whether or not each of the blocks is an Intra Pulse Code Modulation (IPCM) block; filtering a non-IPCM block which is not the IPCM block out of the blocks to generate filtered data; and outputting the filtered data as a value of a pixel in the non-IPCM block, and outputting, as a value of a pixel in the IPCM block, an unfiltered value of the pixel in the IPCM block.

With this structure, the filtering method according to an embodiment of the present invention does not involve filtering on an IPCM block, and thus is capable of suppressing degradation in image quality of the IPCM block.

In addition, in the filtering, the filtered data of the non-IPCM block may be generated by performing filtering using both the value of the pixel in the IPCM block and the value of the pixel in the non-IPCM block.

In addition, the filtering may be deblocking filtering, in the filtering, first filtered data may be generated by filtering a first non-IPCM block out of a first IPCM block and the first non-IPCM block which are adjacent to each other, and in the outputting, the first filtered data may be output as a value of a pixel in the first non-IPCM block, and an unfiltered value of a pixel in the first IPCM block may be output as a value of the pixel in the first IPCM block.

In addition, in the filtering, only the non-IPCM block out of the blocks may be filtered, and the IPCM block does not need to be filtered.

In addition, in the filtering, the filtered data may be generated by filtering all of the blocks, and in the outputting, a filtered value of the pixel in the IPCM block in the filtered data may be replaced by the unfiltered value of the pixel in the IPCM block.

Furthermore, a filtering method according to an aspect of the present invention is for filtering a boundary between an Intra Pulse Code Modulation (IPCM) block and a non-IPCM block which are adjacent to each other in an image, the filtering method comprising: setting a first filter strength for the non-IPCM block, and setting a second filter strength for the IPCM block, the second filter strength being lower than the first filter strength; and filtering the non-IPCM block using the first filter strength, and filtering the IPCM block using the second filter strength.

With this structure, the filtering method according to an embodiment of the present invention is capable of reducing the strength of filtering on the IPCM block, and thereby suppressing degradation in image quality of the IPCM block.

In addition, the second filter strength may specify that filtering is skipped.

With this structure, the filtering method according to an embodiment of the present invention does not involve filtering on an IPCM block, and thus is capable of suppressing degradation in image quality of the IPCM block.

In addition, the first filter strength may be lower than a filter strength that is determined when the non-IPCM block is a block to be intra coded.

It is to be noted that the present invention can be realized as not only such a filtering method but also as a filtering apparatus including units corresponding to the unique steps included in the filtering method, and as a program for causing a computer to execute these unique steps. Naturally, such a program can be distributed through non-transitory computer-readable recording media such as CD-ROM etc. and communication media such as the Internet.

Furthermore, the present invention can be realized as a moving picture coding method and a moving picture decoding method each including such a filtering method. Furthermore, the present invention can be implemented as a moving picture coding apparatus and a moving picture decoding apparatus each including a filtering device, and as a moving picture coding and decoding apparatus including the moving picture coding apparatus and the moving picture decoding apparatus. Furthermore, the present invention can be implemented as a semiconductor integrated circuit (LSI) which exerts part or all of the functions of the filtering device, the moving picture coding apparatus, or the moving picture decoding apparatus.

Advantageous Effects of Invention

The present invention provides a filtering method which enables suppression of deterioration in the image quality of IPCM blocks.

BRIEF DESCRIPTION OF THE DRAWINGS

These and other objects, advantages and features of the invention will become apparent from the following description thereof taken in conjunction with the accompanying drawings that illustrate a specific embodiment of the present invention. In the Drawings:

FIG. 21 illustrates a structure of multiplexed data;

FIG. 24 shows a structure of TS packets and source packets in the multiplexed data;

FIG. 25 shows a data structure of a PMT;

DESCRIPTION OF EMBODIMENTS

Hereinafter, embodiments of the present invention are described in detail with reference to the Drawings. Each of the embodiments described below shows a preferred specific example of the present invention. The numerical values, shapes, materials, structural elements, the arrangement and connection of the structural elements, steps, the processing order of the steps etc. shown in the following embodiments are mere examples, and therefore do not limit the present invention. The present invention is defined by the Claims. Therefore, among the structural elements in the following embodiments, the structural elements not recited in any one of the independent Claims defining the most generic concept of the present invention are not necessarily required to achieve the aim of the present invention. Such optional structural elements are described as structural elements of corresponding ones of preferred embodiments.

Before giving descriptions of the embodiments of the present invention, a description is given of inter-pixel filtering (deblocking filtering) in a boundary between an IPCM block and a non-IPCM block in coding and decoding in H.264.

Figure 1:
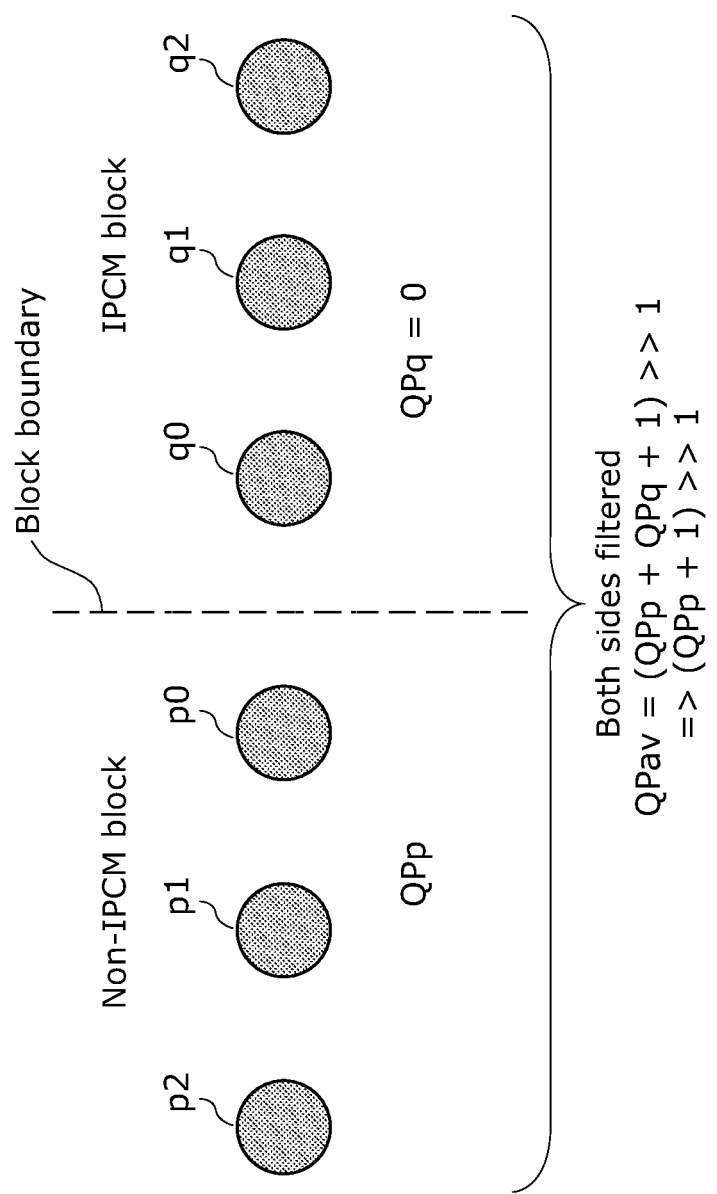
FIG. 1 is an illustration of a method of determining a filter strength at a block boundary between an IPCM block and a non-IPCM block, in the H.264 Standard.

FIG. 1 is a flowchart indicating a concept of a method of determining a filter strength of an inter-pixel filter at a boundary between an IPCM block (macroblock) and a non-IPCM block (macroblock) in coding and decoding schemes according to the H.264 Standard.

FIG. 1 schematically shows the boundary between the two macroblocks one of which is the non-IPCM macroblock (the left side in the illustration) and the other is the IPCM macroblock (the right side in the illustration). Three circles positioned at the left side in FIG. 1 show three pixels (typically, denoted as p0, p1, and p2 sequentially from the boundary). These left-side three pixels belong to a first block (p block) in a first unit (a coded unit block, hereinafter referred to as a CU block). These three pixels also belong to a first macroblock of a non-IPCM type in a macroblock unit block (hereinafter referred to as an MB) that is a unit larger than the first unit.

Likewise, three circles positioned at the right side in FIG. 1 show three pixels (typically, denoted as q0, q1, and q2 sequentially from the boundary). These three pixels belong to a second block (a q block) in the first unit. These three pixels also belong to a second macroblock of an IPCM type in an MB.

Hereinafter, a CU block that belongs to a macroblock of an IPCM type is referred to as an IPCM block, and a CU block that belongs to a macroblock of a non-IPCM block is referred to as a non-IPCM block. In other words, a non-IPCM block means a bock that is not an IPCM block.

Hereinafter, a description is given of a method of determining a filter strength that is applied to pixels q0, q1, p0, and p1 across the block boundary (or a boundary between block units larger than the unit of coding).

A filtering method in H.264 (the filtering method described in Clause 8.7 of the Standard) defines that a filter strength for a boundary between two blocks is normally determined based on the average value of a value qPp derived from a quantization parameter QPp of a first macroblock and a quantization parameter QPq of a second macroblock. More specifically, the following (Expression 1) shown as Expression 8-461 in the Standard is used.

$$QPav = (QPp + QPq + 1) \gg 1 \Rightarrow (QPp + 1) \gg 1 \quad \text{(Expression 1)}$$

This (Expression 1) shows the following calculation. Filter strengths are designed such that a stronger (in smoothness) filter is applied as the value of a quantization parameter is larger, with an aim to, for example, absorb a quantization error.

In the illustration, a left-side quantization parameter QPp is a quantization parameter that is coded for the first macroblock (p-side block). For convenience, QP used here is equivalent in meaning to a value qP that is used for the purpose of filtering. In addition, a right-side quantization parameter QPq is a quantization parameter that should be applied to the second macroblock (q-side block).

Here, as described in Clause 8.7.2 of the H.264 Standard, the value of the quantization parameter qPq (QPq in the illustration) of the IPCM block is set to 0. In other words, "Both sides filtered with weak strength" is realized. This means that, as for a boundary between two blocks, a filter having a filter strength is applied to both the blocks. This also means that it is impossible to differentiate filter strengths for the respective two blocks. In other words, filtering using the same filter strength is executed on both the blocks across the boundary between an IPCM block and a non-IPCM block.

Figure 2:
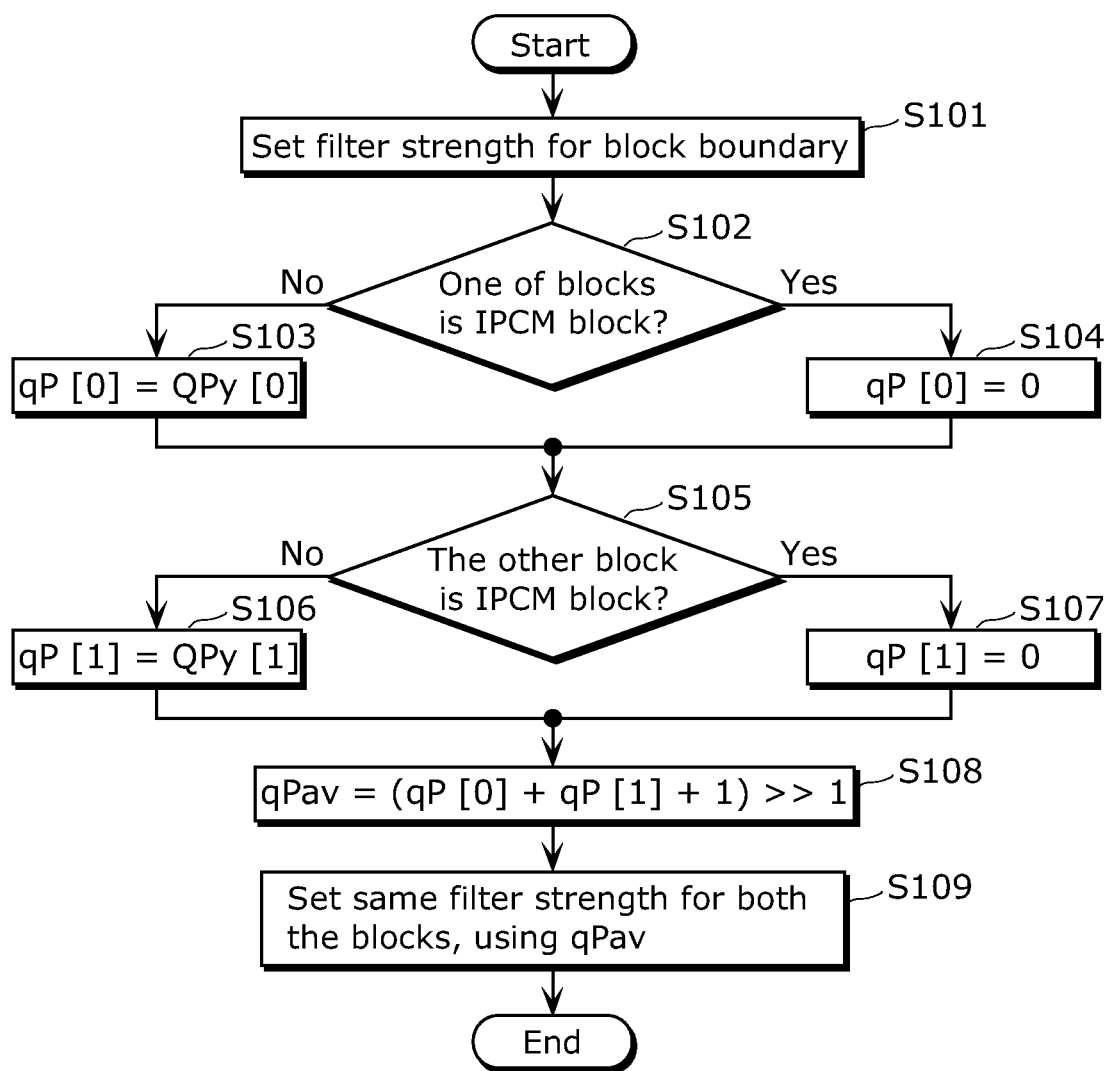
FIG. 2 is a flowchart of processes of filtering at a block boundary, in the H.264 Standard.

FIG. 2 is a flowchart illustrating a concept of filtering at a block boundary described in Clause 8.7 "Deblocking filter process" of the H.264 Standard.

This flowchart roughly explains the following three points regarding an H.264 filter.

(1) Order of Determining Filter Strength (bS) in Clause 8.7.2.1

Step S101 corresponds to the process of "Deviation process for the luma content dependent boundary filter strength" described in Clause 8.7.2.1. This process determines a filter strength in filtering on a block boundary according to a block type and the like. Here, the filter strength is classified into a level among levels ranging from strong filtering (bS=4) to no filtering (bS=0). This point is described with reference to FIG. 3.

(2) Process of Setting Quantization Parameter qPz=0 for IPCM Block

Steps S102 to S107 are processes for setting a value of a quantization parameter qP for determining a filter strength as described with reference to FIG. 1. As for normal non-IPCM blocks (No in Step S102 or S105), the quantization parameter QP [i] (i denotes 0 or 1) of a macroblock to which the non-IPCM block belongs is set as a quantization parameter qP [i] for determining a filter strength (Step S103 and S106). On the other hand, when a current block is an IPCM block (Yes in S102 or S105), the quantization parameter qP of the IPCM block is set to 0 (Step S104 and S107).

Next, in Step S108, qPav is calculated according to (Expression 1).

(3) One bS (or filterSampleFlag) is Shared by Both Blocks

Hereinafter, a description is given of applying a determined filter strength (a value) (or a determination flag specifying whether to perform filtering or not) in common to two blocks across a boundary.

First, after Step S108, calculation using Expressions from 8-462 to 8-467 in the Standard is performed. More specifically, (1) derivation of an index for slight adjustment of a filter strength that is set in Step S101 and (2) derivation of a threshold value for edge determination are performed.

Then, the filter strength determined through these processes is set to both the blocks (S109). More specifically, even when the filter strength bS is any one of 1 to 4, the value derived using the common bS deriving method is applied to the two blocks. For example, when the filter strength bS=4 is satisfied, the value of the pixel p of the first block is derived using Expressions (8-486 and 8-487) in the Standard. In addition, the value of the pixel q included in the second block is derived using the same filter strength as the filter strength used in the derivation of the value of the pixel p. Furthermore, a determination on whether to perform filtering (derivation of the value of filterSamplesFlag (also referred to as a filtering execution flag)) is performed in preparation for, for example, a case where a block boundary is finally found to be an actual edge. More specifically, this determination is made by comparison between two threshold values (two_threths ($\alpha$, $\beta$)) derived in Step S109 and actual pixel values of p and q (see Expression (8-468) in the Standard). However, as described above, it is impossible to set different values (or execution or non-execution) as the filter strengths bS or the filtering execution flags for the respective two blocks.

In other words, in H.264, it is impossible to perform processing suitable for IPCM when seen within a filtering process.

Figure 3:
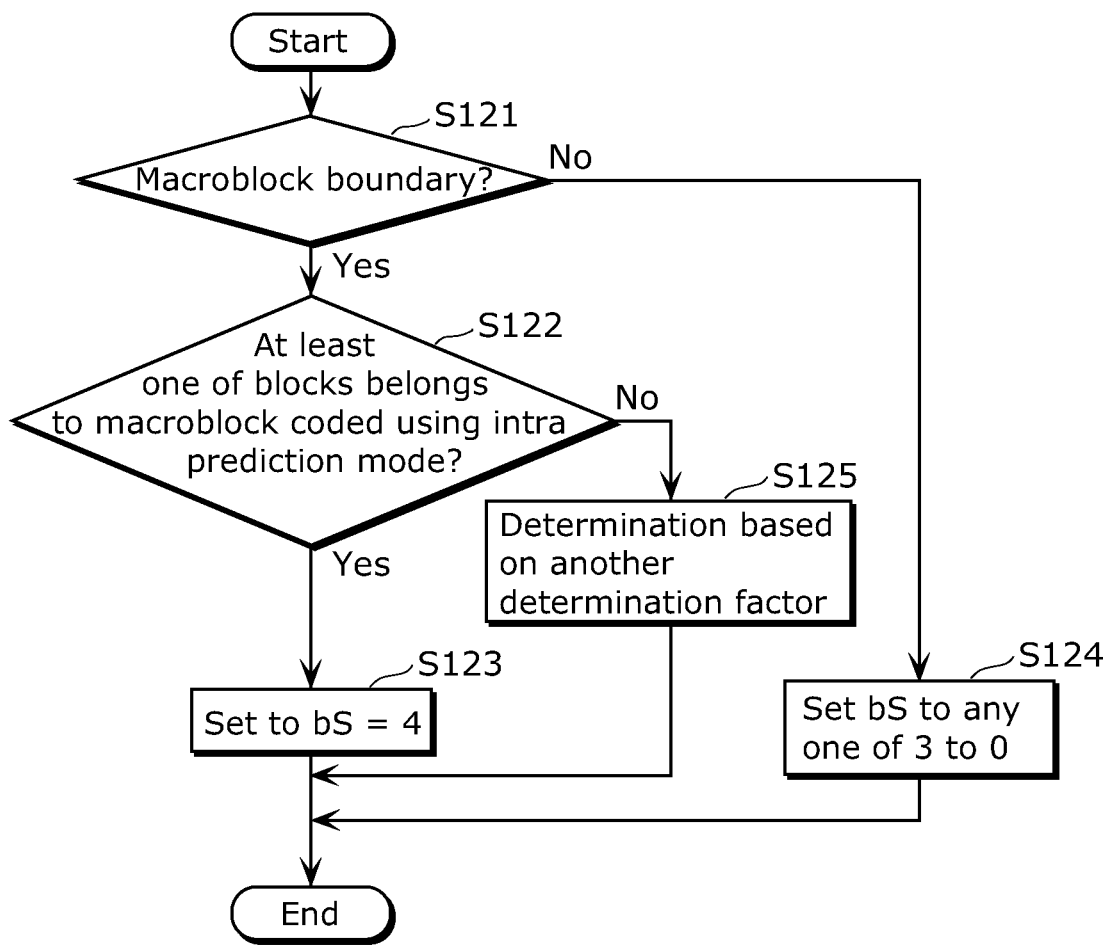
FIG. 3 is a flowchart of processes of determining a filter strength, in the H.264 Standard.

FIG. 3 is a flowchart indicating the order of deciding (order of determining) a filter strength (bS) that is applied to pixels located across a boundary between two macroblocks, as described in Clause 8.7.2.1 of the Standard. This flowchart illustrates the determination order in Step S101 shown in FIG. 2, and conforms to the determination flow in Clause 8.7.2.1 of the Standard.

First, a determination is made as to whether the boundary defined by the pixel p0 in the first block and the pixel q0 in the second block also corresponds to a boundary between macroblocks or not (S121). In other words, a determination is made as to whether p0 and q0 are located across the macroblock boundary.

When the block boundary between the processing targets is not a macroblock boundary (No in S121), the filter strength (bS) is determined to be any one of 3, 2, 1, and 0 that is smaller than N (=4) (S124).

On the other hand, when the block boundary between the processing targets is a macroblock boundary (Yes in S121), a determination is made as to whether one (or both) of p0 and q0 belongs to a macroblock coded using the intra prediction mode (S122).

When both the blocks do not belong to a macroblock coded using the intra prediction mode (No in S122), a determination based on another determination factor is executed (S125).

On the other hand, when at least one of the blocks belongs to a macroblock coded using the intra prediction mode (Yes in S122), the filter strength is (always) set to bS=4 that means the highest strength without considering any other determination factor (S123).

In this way, the conventional filtering method does not make it possible to execute internal filtering processes for such two blocks that are located across the boundary in different manners (in terms of filter strengths and application or non-application of a filter). In addition, the Standard considers processes up to the determination of a filter strength focusing on IPCM, but does not make it possible to perform control for outputting raw pixel values of an IPCM block when one of the blocks is an IPCM block and the other is a non-IPCM block.

An IPCM block is a block including pixel values faithfully showing "the original image" without a coding loss. Accordingly, in the filtering process, it is desirable to control filtering at the boundary with an IPCM block or to control application of a filter to the IPCM block.

Embodiment 1

Hereinafter, a description is given of a filtering method according to Embodiment 1 of the present invention.

Figure 4:
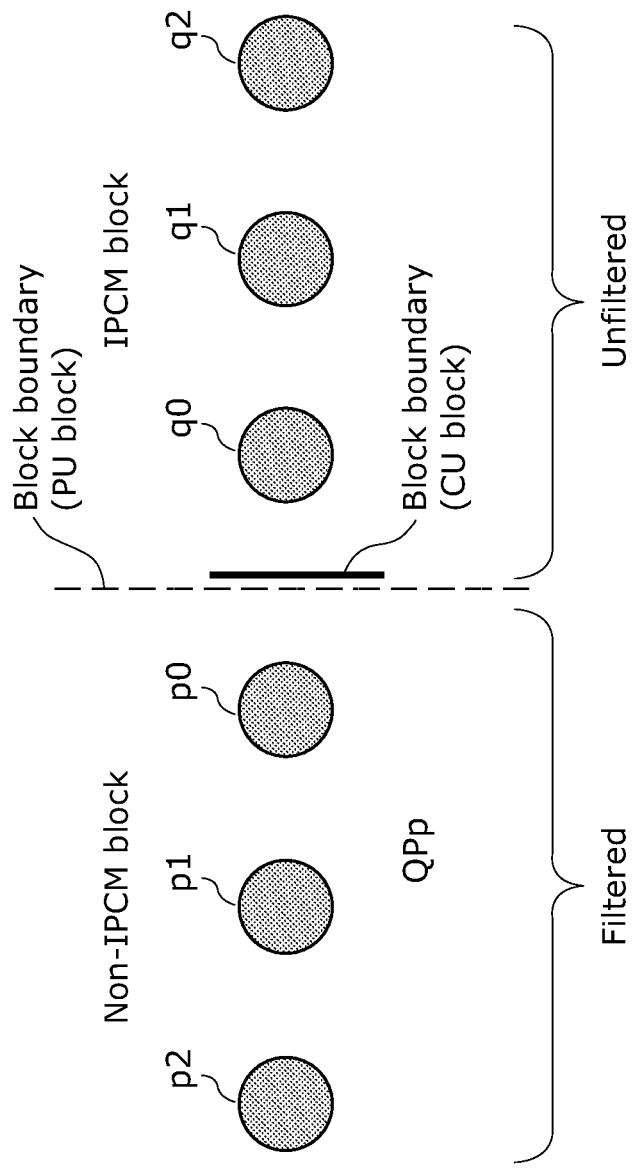
FIG. 4 is an illustration of a filter strength in a filtering method according to Embodiment 1 of the present invention.

FIG. 4 illustrates a concept of a method of determining a factor for application of the filtering method according to this embodiment and determining a filter strength of an inter-pixel filter. Three circles in the illustration show pixels included in the first block as in FIG. 1. The same elements as in FIG. 1 among the remaining elements are not described again.

A filtering method according to this embodiment is for filtering a plurality of blocks included in an image. Typically, the filtering method is applied to deblocking filtering that is performed on a boundary between adjacent blocks. Hereinafter, a description is given of an example of applying deblocking filtering to the present invention. However, the present invention is also applicable to in-loop filtering (Adaptive Loop Filter) other than deblocking filtering.

The filtering method according to this embodiment is different from the filtering method described with reference to FIG. 1 in the points indicated below.

First, unfiltered pixel values are output as the pixel values of three pixels of the block that is IPCM at the right side in the illustration.

In addition, control is performed to differentiate filtering for the first block and filtering for the second block. For example, a filter is applied to one (at the left side) of the blocks across the boundary in the illustration, and no filter is applied to the other (at the right side). In this way, such control for performing the different filtering processes between the blocks is performed.

Next, the filter strength for the left-side block to which the filter is applied is derived based only on the quantization parameter QPp of the left-side block. In other words, the filter strength of the non-IPCM block at the left side is derived without using the quantization parameter QPq of the right-side macroblock or any other substitute fixed value (0 in the conventional example).

A determination regarding IPCM in H.264 shown in FIG. 2 is made as to whether or not a current block is an IPCM macroblock. Here, such a determination as to whether or not a current block is an IPCM macroblock is made based on a prediction unit (PU) that has a variable size. In other words, an IPCM block below is a block that belongs to a PU block of an IPCM type, and a non-IPCM block is a block that belongs to a PU block of a non-IPCM type.

Hereinafter, these operations are described with reference to the drawings.

Figure 5:
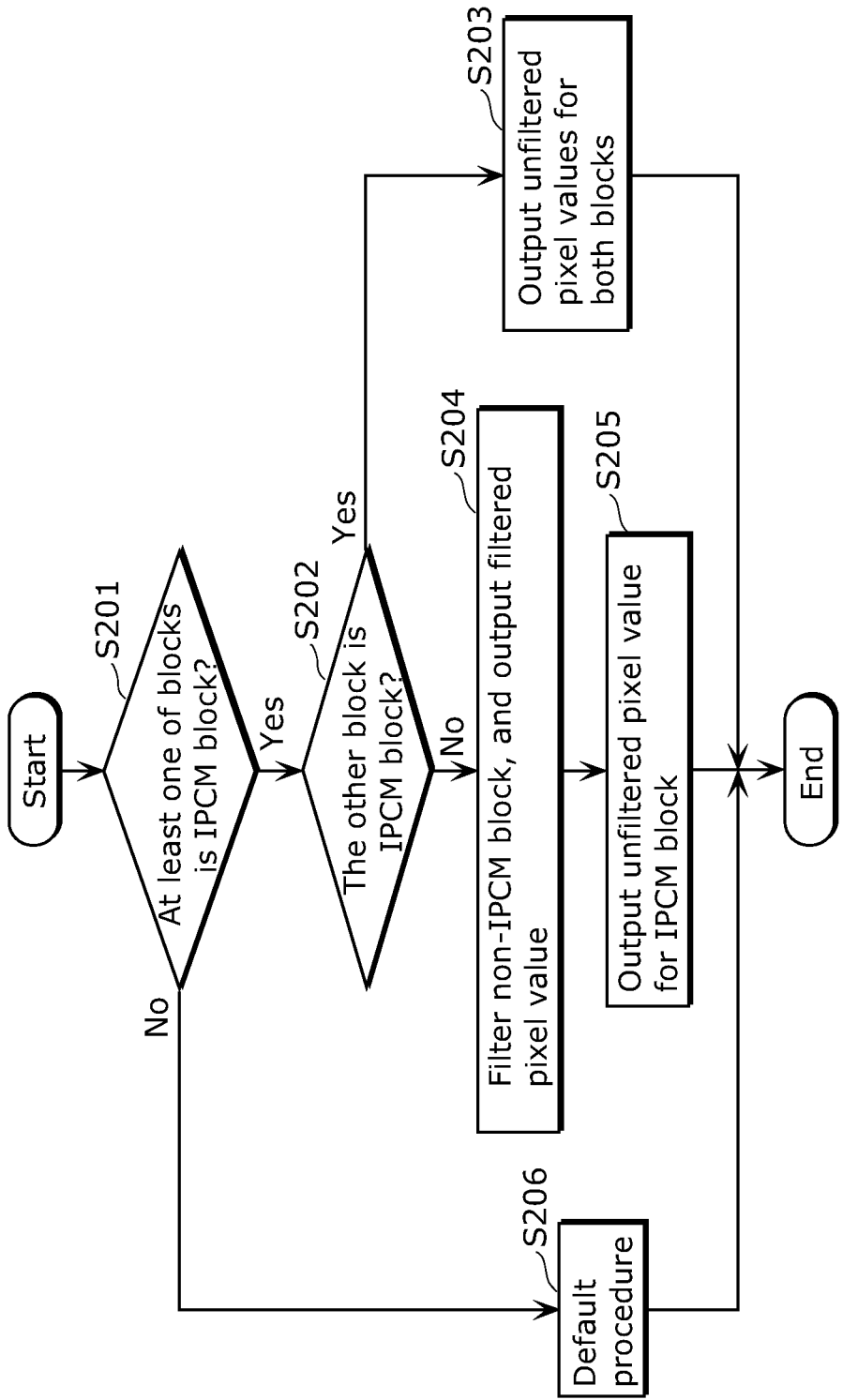
FIG. 5 is a flowchart of a filtering method according to Embodiment 1 of the present invention.

FIG. 5 is a flowchart of a processing order in a filtering method according to this embodiment.

The filtering method according to this embodiment is executed as a part of coding processes or decoding processes. Accordingly, this filtering method is executed by one of a filtering unit in a coding loop within a moving picture coding apparatus shown in FIG. 6 described later and a filtering unit in a decoding loop within a moving picture decoding apparatus shown in FIG. 9 described later, and a control unit for controlling the filter.

The control unit determines whether the PU block type of one of the two blocks sharing the boundary is IPCM or not (S201). In the exemplary case of FIG. 4, the right-side PU block is an IPCM block, and thus the one is determined to be of an IPCM type. More specifically, the control unit executes this determination using a macroblock type, or an attribute parameter of image data such as a motion compensation block size.

When at least one of the two blocks is an IPCM block (Yes in S201), the control unit determines whether the other of the two blocks is an IPCM block or not (S202). For example, as in the case of the illustration in FIG. 4, the right-side block is an IPCM block. Accordingly, the control unit determines whether the other block that is the left-side block is an IPCM block or not.

In other words, in steps S201 and S202, the control unit determines whether each of the blocks is an IPCM block or a non-IPCM block. More specifically, the control unit determines (1) whether both of the two blocks are non-IPCM blocks (No in S201), and (2) whether both of the two blocks are IPCM blocks (Yes in S202) or (3) whether one of the blocks is an IPCM block and the other is a non-IPCM block (No in S202).

When the other block is an IPCM block (Yes in S202), that is, when both the blocks are IPCM blocks, filtering is skipped for the pixels p and q of both the blocks (both of the first block and the second block (S203).

On the other hand, when the other block is not an IPCM block (No in S202), that is, only one of the blocks is an IPCM block, and the other is a non-IPCM block, the control unit performs control for causing the filtering unit to execute filtering in Steps S204 and S205.

First, the filtering unit executes filtering using a predetermined strength on pixels included in the non-IPCM block (for example, the three pixels at the left side in FIG. 4), and outputs the filtered pixel values as the pixel values of the non-IPCM block (S204). In addition, this filtering also uses pixel values of an IPCM block, in addition to the pixel values of the non-IPCM block. More specifically, the filtering unit smoothes the pixel values of the non-IPCM block and the pixel values of the IPCM block to calculate the pixel values of the filtered non-IPCM block.

In addition, the filtering unit outputs the unfiltered pixel values for the pixels included in the IPCM block (pixels q0, q1, . . . at the q side) (S205). Here, the unfiltered pixel values are output in the following two conceivable cases.

A first method is a method of filtering a non-IPCM block, and outputting the original pixel values of an IPCM block without filtering.

A second method is a method of filtering both of a non-IPCM block and an IPCM block, replacing the pixel values of the IPCM block among the filtered pixel values by the original pixel values before the filtering, and outputting the replacement pixel values. In any one of the cases, the IPCM block's pixel values that are output are the original pixel values before the execution of the filtering.

The filtering method can be regarded as involving control for taking different filtering approaches (filter strengths, application or non-application of a filter, and the number(s) of pixels in the application) between the blocks.

The filtering (especially, operations by the control unit and the filtering unit) in Steps S204 and S205 are described later with reference to FIGS. 6 to 8.

In addition, when both the blocks are non-IPCM blocks in Step S201 (No in S201), the control unit performs default filtering operation (S206). In other words, the control unit executes filtering using a predetermined filter strength on both the blocks.

Hereinafter, a description is given of a moving picture coding apparatus which performs the filtering method.

Figure 6:
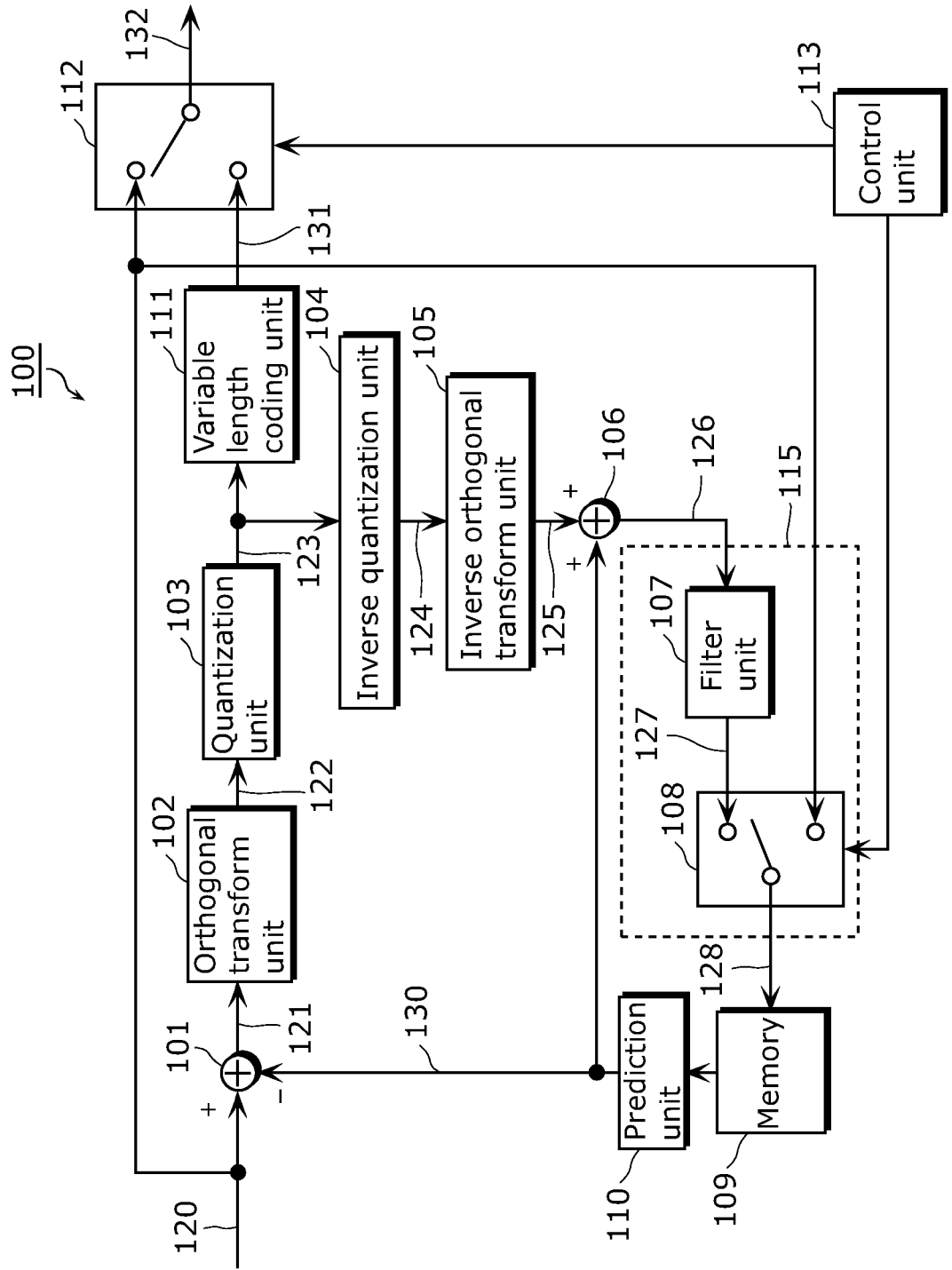
FIG. 6 is a block diagram of a moving picture coding apparatus according to Embodiment 1 of the present invention.

FIG. 6 is a functional block diagram of a moving picture coding apparatus 100 according to this embodiment of the present invention. The moving picture coding apparatus 100 shown in FIG. 6 codes an input image signal 120 to generate a coded bit stream 132. The moving picture coding apparatus 100 comprises a subtractor 101, an orthogonal transform unit 102, a quantization unit 103, an inverse quantization unit 104, an inverse orthogonal transform unit 105, an adder 106, a filtering unit 115, a memory 109, a prediction unit 110, a variable length coding unit 111, a selecting unit 112, and a control unit 113.

The subtractor 101 calculates a difference between the input image signal 120 and a prediction image signal 130 to generate a residual signal 121. The orthogonal transform unit 102 performs orthogonal transform on the residual signal 121 to generate a transform coefficient 122. The quantization unit 103 quantizes the transform coefficient 122 to generate the quantized coefficient 123.

The inverse quantization unit 104 performs inverse quantization on the quantized coefficient 123 to generate the transform coefficient 124. The inverse orthogonal transform unit 105 performs inverse orthogonal transform on the transform coefficient 124 to generate a decoded residual signal 125. The adder 106 adds the decoded residual signal 125 and the prediction image signal 130 to generate a decoded image signal 126.

The filtering unit 115 filters the decoded image signal 126 to generate an image signal 128, and stores the generated image signal 128 in the memory 109.

The prediction unit 110 selectively performs intra prediction and inter prediction using the image signal 128 stored in the memory 109 to generate a prediction image signal 130.

The variable length coding unit 111 performs variable length coding (entropy coding) on the quantized coefficient 123 to generate a coded signal 131.

The selecting unit 112 selects the input image signal 120 when a current block is an IPCM block, and selects a coded signal 131 when a current block is a non-IPCM block. Then, the selecting unit 112 outputs the selected signal as a coded bit stream 132.

The control unit 113 controls the filtering unit 115 and the selecting unit 112.

Here, the orthogonal transform unit 102 and the quantization unit 103 are examples of transform and quantization units which generate a quantization coefficient by performing transform and quantization on the residual signal. In addition, the variable length coding unit 111 is an example of a coding unit which codes the quantized coefficient to generate a coded signal. In other words, the inverse quantization unit 104 and the inverse orthogonal transform unit 105 are examples of an inverse quantization unit and an inverse transform unit which generate a decoded residual signal by performing inverse quantization and inverse transform on the quantized coefficient.

Here, especially major elements of the moving picture coding apparatus 100 according to this embodiment are the control unit 113 and the filtering unit 115.

As described above, the filtering method according to this embodiment is executed as parts of the coding processes and the decoding processes. Accordingly, the filtering unit 115 is located before the memory 109 for holding reference pictures etc. The filtering unit 115 stores, in the memory 109 in the loops, the result of executing the filtering (or the result of skipping the filtering). In this respect, the filtering unit 115 is the same as a filter called a Loop filter in H.264.

In addition, the filtering unit 115 has two input lines. A first one of the input signals is a decoded image signal 126 representing the pixel values of the non-IPCM block, and a second one of the input signals is an input image signal 120 representing the pixel values of the IPCM block. Here, the decoded image signal 126 is a reconstructed coded image signal after being subjected to transform, quantization, inverse quantization, and inverse transform. In addition, the input image signal 120 is the original image signal which is not subjected to the coding and decoding.

Under control of the control unit 113, the filtering unit 115 outputs the unfiltered original pixel values of the IPCM block, and filters the pixel values of the non-IPCM block and outputs the filtered values.

This filtering unit 115 includes a filter unit 107 and a selecting unit 108. The filter unit 107 filters the decoded image signal 126 to generate an image signal 127. The selecting unit 108 selects the image signal 127 when a current block is an IPCM block, and selects an input image signal 120 when a current block is a non-IPCM block and then outputs the selected signal as an image signal 128.

Figure 7A:
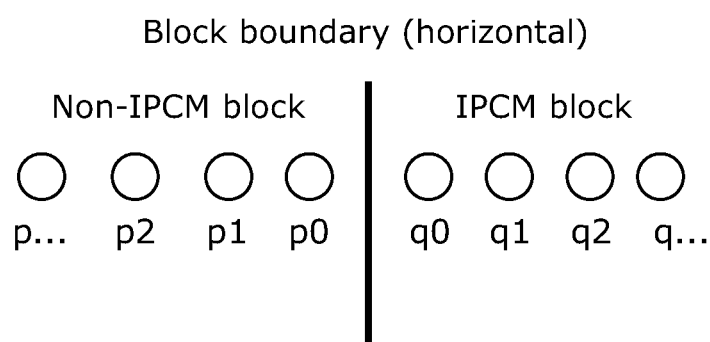
FIG. 7A is an illustration of an example of a block boundary according to Embodiment 1 of the present invention.
Figure 7B:
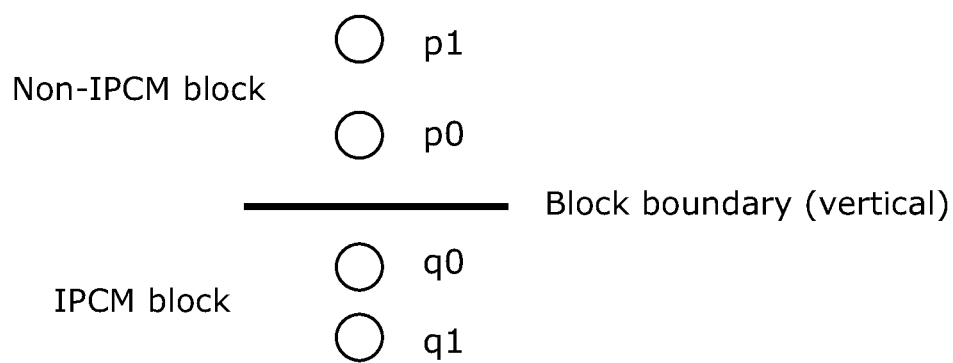
FIG. 7B is an illustration of an example of a block boundary according to Embodiment 1 of the present invention.

Each of FIGS. 7A and 7B is an illustration of an example of pixels across a boundary between two blocks. In the example shown in FIG. 7A, the two blocks are adjacent to each other in the horizontal direction. Here, the block including the pixels p0 to pn at the left side is referred to as a first block. This first block is a non-IPCM block. In addition, the other block is referred to as a second block. This second block is an IPCM block. Here, as shown in FIG. 7B, the filtering in this embodiment is naturally applicable in the case where an IPCM block and a non-IPCM block are adjacent to each other in the vertical direction.

Hereinafter, a description is given of a specific example of operations by the filtering unit 115.

Figure 8A:
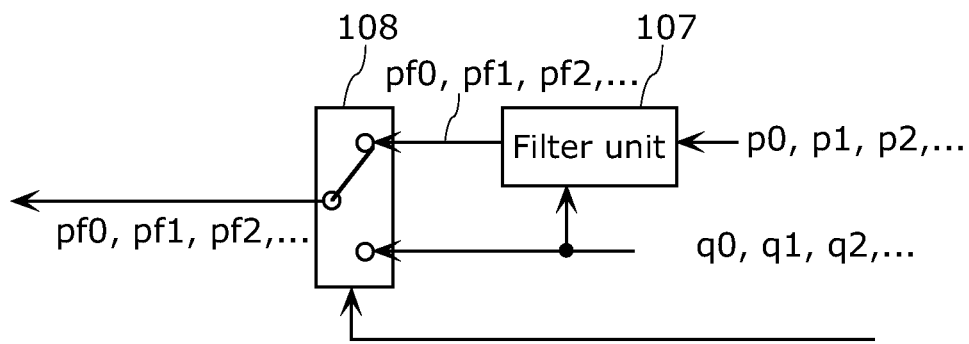
FIG. 8A is an illustration of operations performed by a filtering unit according to Embodiment 1 of the present invention.
Figure 8B:
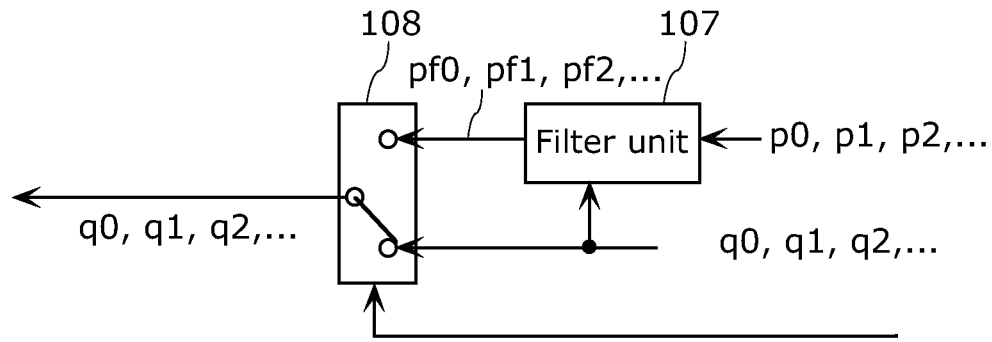
FIG. 8B is an illustration of operations performed by a filtering unit according to Embodiment 1 of the present invention.

Each of FIG. 8A and FIG. 8B is an illustration of operations performed by the filtering unit 115 in the case of filtering pixels p [i] and q [j] included in the two blocks illustrated in FIG. 7A. In other words, the first block belongs to the non-IPCM block, and the second block is the IPCM block.

The filtering unit 115 performs operations shown in FIG. 8A and FIG. 8B according to a control signal from the control unit 113.

FIG. 8A is an illustration of an operation by the filtering unit 115 on the non-IPCM block. This operation corresponds to Step S204 shown in FIG. 5. In other words, the filtering unit 115 calculates output results pf0, pf1, . . . of the pixels corresponding to the first block, using both the pixel values (p0, p1, . . . ) of the first block and the pixel values (q0, q1, . . . ) of the second block.

FIG. 8B is an illustration of operations by the filtering unit 115 on the IPCM block. This operation corresponds to Step S205 shown in FIG. 5. In other words, the filtering unit 115 outputs the same values (unfiltered pixel values) as the input values q0, q1, and q2, for the pixels of the second block.

Hereinafter, a description is given of a moving picture decoding apparatus which performs the filtering method.

Figure 9:
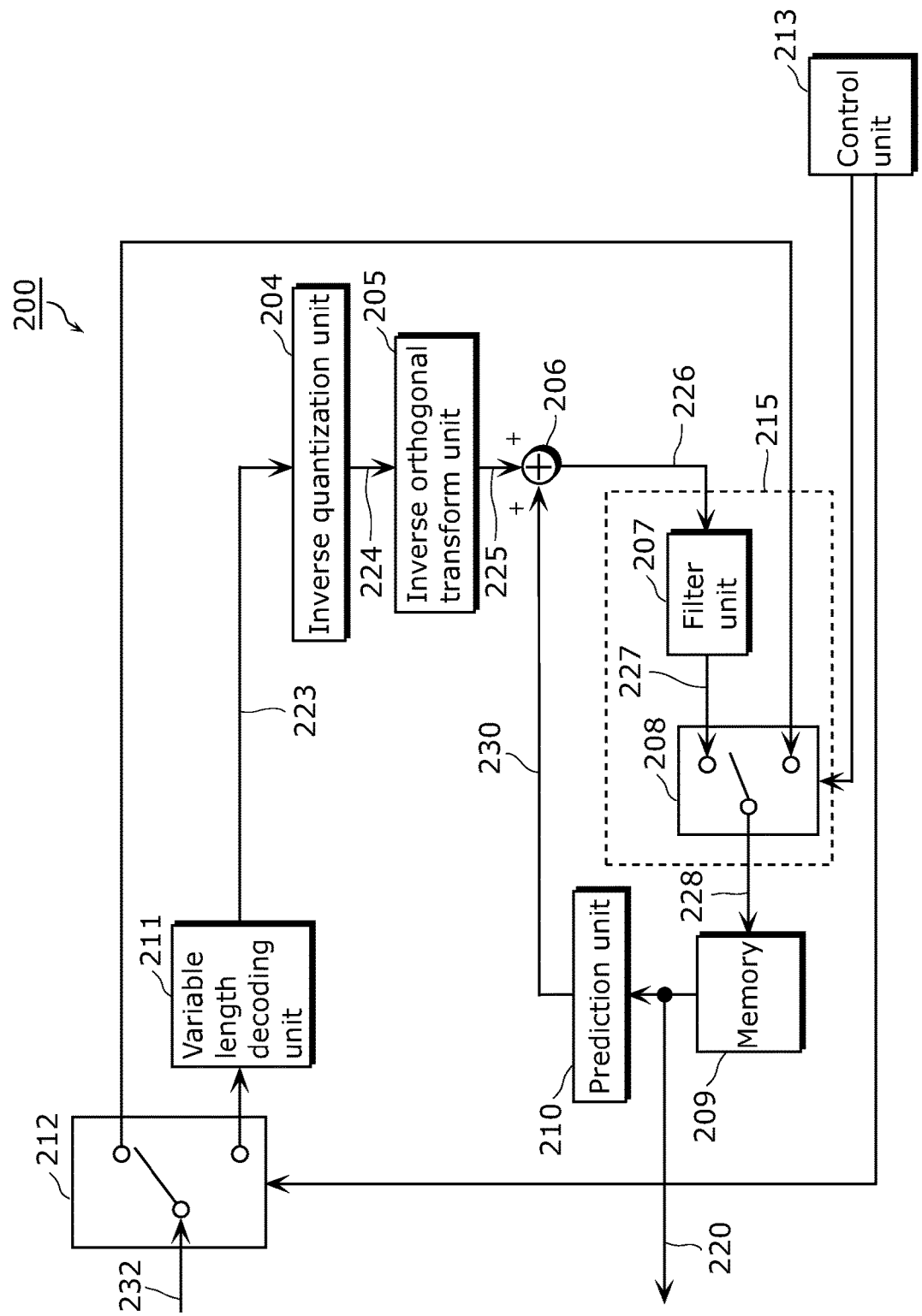
FIG. 9 is a block diagram of an image decoding apparatus according to Embodiment 1 of the present invention.

FIG. 9 is a functional block diagram of a moving picture decoding apparatus according to this embodiment.

The moving picture decoding apparatus 200 shown in FIG. 9 decodes the coded bit stream 232 to generate an output image signal 220. Here, the coded bit stream 232 is, for example, a coded bit stream 132 generated by the moving picture coding apparatus 100.

This moving picture decoding apparatus 200 comprises an inverse quantization unit 204, an inverse orthogonal transform unit 205, an adder 206, a filtering unit 215, a memory 209, a prediction unit 210, a variable length decoding unit 211, a distributing unit 212, and a control unit 231.

The distributing unit 212 supplies the coded bit stream 232 to the filtering unit 215 when a current block is an IPCM block, and supplies the coded bit stream 232 to the variable length decoding unit 211 when a current block is a non-IPCM block.

The variable length decoding unit 211 performs variable length decoding (entropy decoding) on the coded bit stream 232 to generate a quantized coefficient 223.

The inverse quantization unit 204 performs inverse quantization on the transform coefficient 223 to generate the transform coefficient 224. The inverse orthogonal transform unit 205 performs inverse orthogonal transform on the transform coefficient 224 to generate a decoded residual signal 225. The adder 206 adds the decoded residual signal 225 and the prediction image signal 230 to generate a decoded image signal 226.

The filtering unit 215 filters the decoded image signal 226 to generate an image signal 228, and stores the generated image signal 228 in the memory 209.

This filtering unit 215 includes a filter unit 207 and a selecting unit 208. The filter unit 207 filters the decoded image signal 226 to generate an image signal 227. The selecting unit 208 selects the image signal 227 when a current block is an IPCM block, and selects an input image signal 232 when a current block is a non-IPCM block and then outputs the selected signal as an image signal 228.

In addition, the image signal 228 stored in the memory 209 is output as an output image signal 220.

The prediction unit 210 selectively performs intra prediction and inter prediction using the image signal 228 stored in the memory 209 to generate a prediction image signal 230.

The control unit 213 controls the filtering unit 215 and the distributing unit 212.

Here, the variable length decoding unit 211 is an example of a decoding unit which decodes the coded bit stream to generate a quantized coefficient. In other words, the inverse quantization unit 204 and the inverse orthogonal transform unit 205 are examples of an inverse quantization unit and an inverse transform unit which generate a decoded residual signal by performing inverse quantization and inverse transform on the quantized coefficient.

Here, operations by the filtering unit 215 are the same as operations by the filtering unit 115 of the moving picture coding apparatus 100. The control unit 213 is different from the control unit 113 included in the moving picture coding apparatus 100 in the point of determining whether the PU unit type of the first block or the second block is IPCM or not from the coded bit stream 232 that is an input coded string, but is the same in the other functions.

Hereinafter, descriptions are given of structures of variations of the filtering units 115 and 215.

Each of FIG. 10A to FIG. 10H is an illustration of a conceivable implementation regarding a filter input-output relationship of filtering units 115 and 215.

Figure 10A:
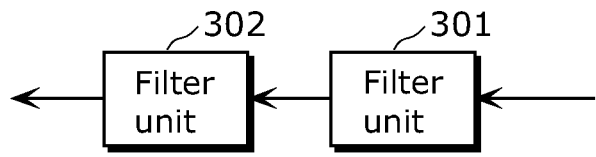
FIG. 10A is an illustration of an exemplary structure of filtering units according to Embodiment 1 of the present invention.

As shown in FIG. 10A, each of the filter units 107 and 207 may include filter units 301 and 302 connected in series. For example, the first filter unit 301 and the second filter unit 302 may perform different processes. In this case, for example, the whole filtering processes are bypassed for the IPCM block.

Figure 10B:
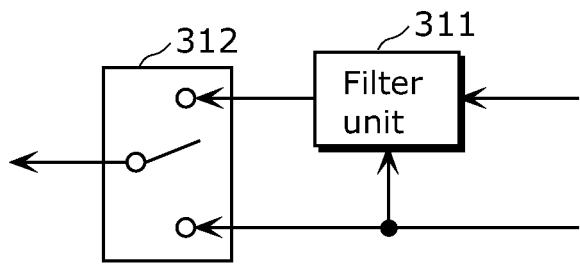
FIG. 10B is an illustration of an exemplary structure of a filtering unit according to Embodiment 1 of the present invention.

As shown in FIG. 10B, the filter unit 311 may perform filtering using both the input signals. In this case, the selecting unit 312 outputs unfiltered values for the IPCM block, and the filter unit 311 outputs filtered values for the non-IPCM block.

Figure 10C:
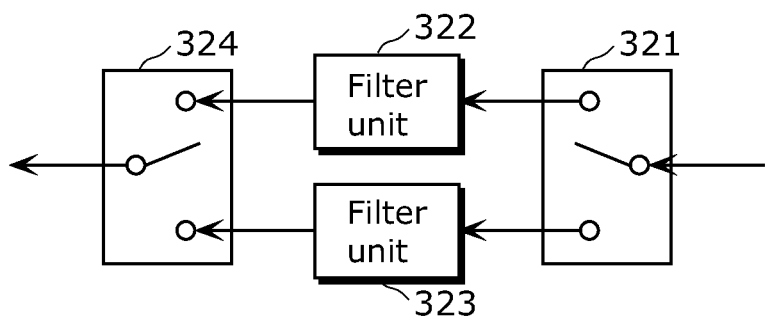
FIG. 10C is an illustration of an exemplary structure of filtering units according to Embodiment 1 of the present invention.

As shown in FIG. 10C, it is also good to perform filtering processes different between the IPCM block and the non-IPCM block. For example, different filtering processes may be filtering processes using different filter strengths. In addition, for example, the filter strength for the IPCM block may be lower than the filter strength for the non-IPCM block.

More specifically, the distributing unit 321 outputs the input signal to the filter unit 322 when a current block is a non-IPCM block, and outputs the input signal to the filter unit 323 when a current block is an IPCM block. Here, the input signals include both the decoded image signal 126 and the input image signal 120. The filter unit 322 performs filtering of a first filter strength using the input signal to generate pixel values of the current block. The filter unit 322 performs filtering using a second filter strength lower than the first filter strength to generate pixel values of the current block. The selecting unit 324 outputs the pixel values of the current block filtered by the filter unit 322 when the current block is the non-IPCM block, and outputs the pixel values of the current block filtered by the filter unit 323 when the current block is the IPCM block.

Figure 10D:
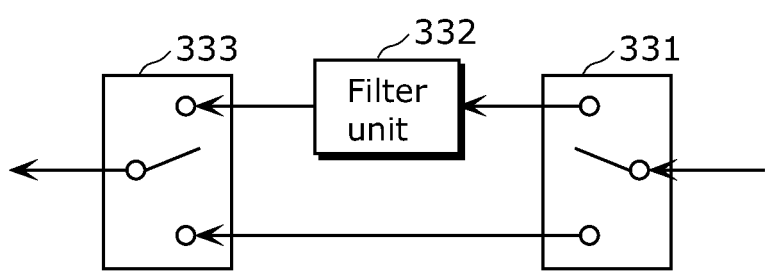
FIG. 10D is an illustration of an exemplary structure of a filtering unit according to Embodiment 1 of the present invention.

As shown in FIG. 10D, processing on the IPCM block does not always need to be performed. More specifically, the distributing unit 331 outputs the input signal to the filter unit 332 when a current block is a non-IPCM block, and outputs the input signal to the selecting unit 333 when a current block is an IPCM block. The selecting unit 333 outputs the pixel values of the current block filtered by the filter unit 332 when the current block is the non-IPCM block, and outputs the pixel values of the current block in the signal from the filter unit 331 when the current block is the IPCM block.

Figure 10E:
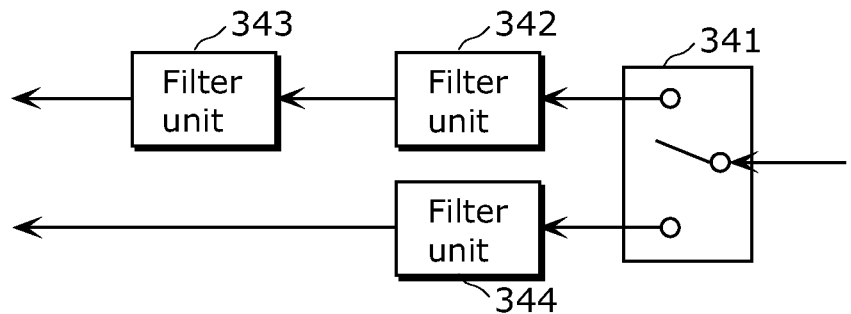
FIG. 10E is an illustration of an exemplary structure of filtering units according to Embodiment 1 of the present invention.

As shown in FIG. 10E, it is possible to switch input sides of filter units instead of switching output sides of the filter units. Furthermore, the numbers of the stages of filter units are different between an IPCM block and a non-IPCM block. More specifically, the distributing unit 341 outputs the input signal to the filter unit 342 when a current block is a non-IPCM block, and outputs the input signal to the filter unit 344 when a current block is an IPCM block. The filter unit 342 performs filtering using the input signal. The filter unit 343 performs filtering using the signal filtered by the filter unit 342, and outputs the pixel values of the current filtered block. The filter unit 344 performs filtering using the input signal, and outputs the pixel values of the current filtered block. Here, the filtering performed by the filter unit 344 may be the same as or different from the filtering performed by the filter unit 342 and the filtering performed by the filter unit 343.

Figure 10F:
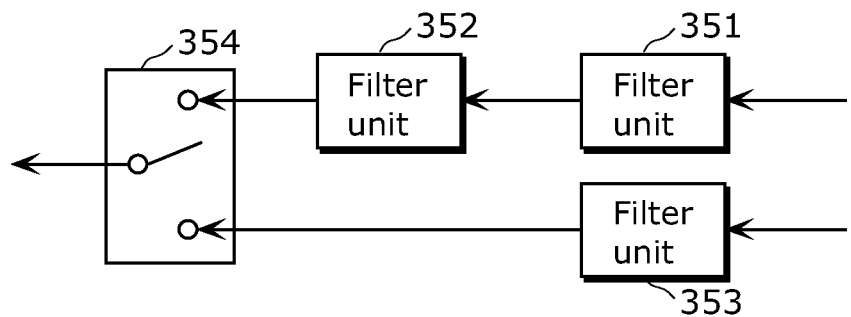
FIG. 10F is an illustration of an exemplary structure of filtering units according to Embodiment 1 of the present invention.

As shown in FIG. 10F, it is possible to switch output sides of filter units. More specifically, the filter unit 351 performs filtering using the first input signal. The filter unit 352 performs filtering using the signal filtered by the filter unit 351, and outputs the pixel values of the current filtered block. The filter unit 353 performs filtering using the second input signal, and outputs the pixel values of the current filtered block. The selecting unit 354 outputs the pixel values of the current block filtered by the filter unit 352 when the current block is the non-IPCM block, and outputs the pixel values of the current block filtered by the filter unit 353 when the current block is the IPCM block.

Here, outputting an unfiltered value involves replacing a pixel value resulting from filtering by the original input value p and outputting the replacement value.

Figure 10G:
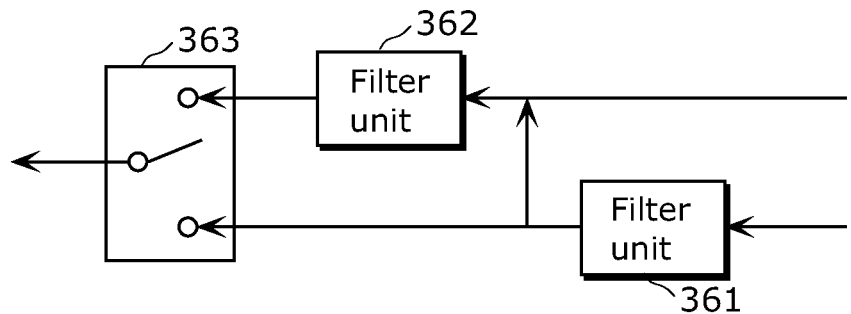
FIG. 10G is an illustration of an exemplary structure of filtering units according to Embodiment 1 of the present invention.

As shown in FIG. 10G, it is possible to use a signal filtered in one of two lines in filtering that is performed in the other line. More specifically, the filter unit 361 performs filtering using the second input signal. The filter unit 362 performs filtering using the first input signal and a signal filtered by the filter unit 361. The selecting unit 363 outputs the pixel values of the current block filtered by the filter unit 362 when the current block is the non-IPCM block, and outputs the pixel values of the current block filtered by the filter unit 361 when the current block is the IPCM block. The selecting unit 363 may output the pixel values of the current block filtered by the filter unit 362 when the current block is the IPCM block, and output the pixel values of the current block filtered by the filter unit 361 when the current block is the non-IPCM block.

Figure 10H:
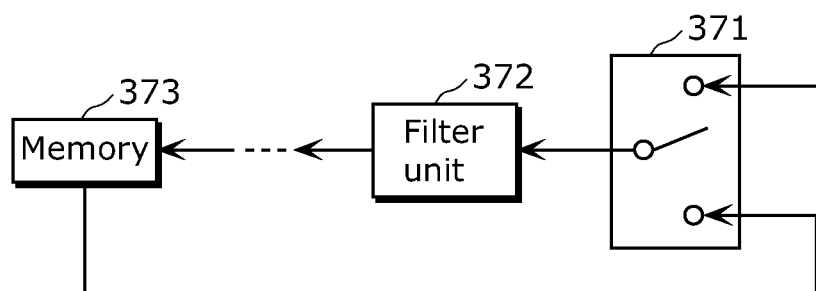
FIG. 10H is an illustration of an exemplary structure of a filtering unit according to Embodiment 1 of the present invention.

As shown in FIG. 10H, a value stored once in the memory 373 may be used as an input. More specifically, the selecting unit 371 selects one of the input signal and the signal stored in the memory 373. The filter unit 372 performs filtering using the signal selected by the selecting unit 371.

These are examples, and thus it is only necessary for the filtering unit 115 according to this embodiment to exert a function of finally "outputting unfiltered values for the pixels in an IPCM block".

Figure 11:
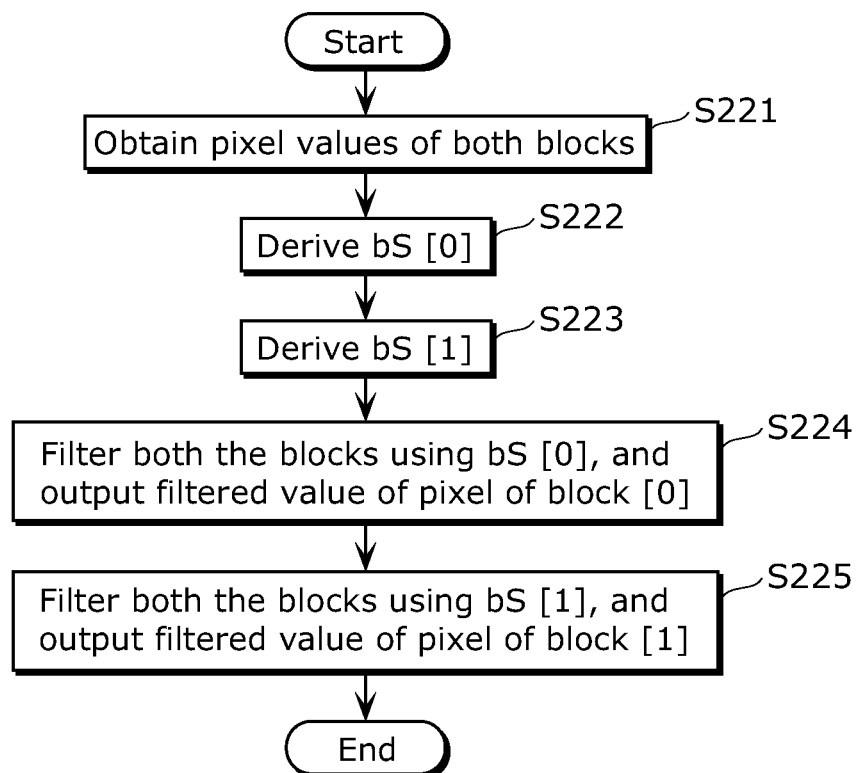
FIG. 11 is a flowchart of a filtering method according to Embodiment 1 of the present invention.

Hereinafter, a description is given of a modified version of a filtering method according to the present invention. FIG. 11 is a flowchart of operations in the modified version of the filtering method according to this embodiment.

It has been described that filtering is applied to the non-IPCM block in Step S204 of FIG. 5 and unfiltered pixel values of the IPCM block are output in Step S205 of FIG. 5. However, these processes may be realized in the steps indicated below. For example, it is possible to perform processes shown in FIG. 11 instead of Steps S204 and S205 shown in FIG. 5.

First, pixel values of a first block (block [0]) and a second block (block y [1]) adjacent to each other are obtained (S221). Here, for example, the first block is a non-IPCM block, and the second block is an IPCM block.

Next, a filter strength bS [0] that is applied to the first block and a filter strength bS [1] that is applied to the second block are derived (S222 and S223). Here, the filter strength bS [0] and the filter strength bS [1] show different strengths. In the conventional art, only one filter strength is set for a block boundary. For example, in this embodiment, the filter strength for the IPCM block is set lower than the filter strength for the non-IPCM block.

Next, both the blocks are filtered using the filter strength bS [0], and the pixel values of the first block after the filtering are output (S224). Next, both the blocks are filtered using the filter strength bS [1], and the pixel values of the second block after the filtering are output (S225).

Here, it is possible to control application or non-application of filtering by setting the value of the filter strength to 0. In other words, it is also good to derive for each of the blocks a flag (filterSamplesFlag) for controlling application or non-application of filtering.

As described above, the filtering method according to this embodiment makes it possible to execute filtering on one of the blocks using the first filter strength and execute filtering on the other block using the second filter strength. In addition, the filtering method makes it possible to perform such processing in filtering processes.

Figure 12:
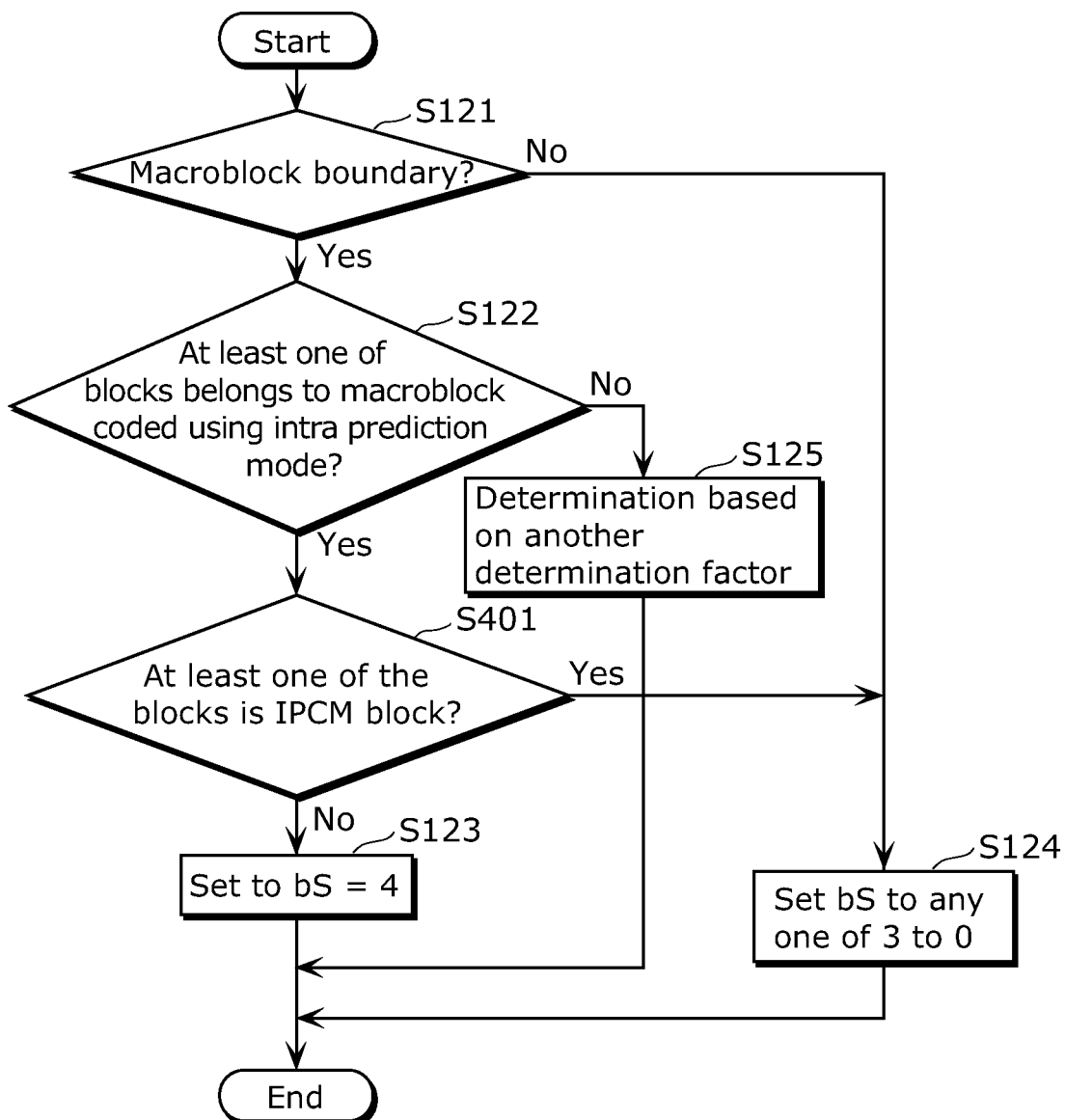
FIG. 12 is a flowchart of a filtering method according to Embodiment 1 of the present invention.

FIG. 12 is a flowchart of operations in a variation of the filtering method according to this embodiment. The processes shown in FIG. 12 further include Step S401, in addition to the processes shown in FIG. 3.

This Step S401 is added to provide an appropriate filter strength to an IPCM block which is inevitably determined to be a block that is intra predicted. In Step S401, a determination is made as to whether at least one of the first block and the second block is an IPCM block or not. When at least one of the first block and the second block is the IPCM block (Yes in S401), a filter strength (bS) is determined to be any one of 3, 2, 1, and 0 that is smaller than N (=4) (S124). In addition, when both the first block and the second block are non-IPCM blocks (No in S401), the filter strength is set to bS=N which means the highest strength (S123).

In the case of the filtering method shown in FIG. 3, when one or both of the blocks is a macroblock coded using the intra prediction mode (Yes in S122), the filter strength itself is always set to be bS=4 which means the highest strength without considering any other determination factor.

On the other hand, in the case of this embodiment's variation shown in FIG. 12, when one or both of the blocks is a macroblock coded using the intra prediction mode (Yes in S122) and when one of the blocks is an IPCM block (Yes in S401), a filter strength (bS=0 to 3) lower than the filter strength (bS=4) set in Step S123 is set.

Figure 13:
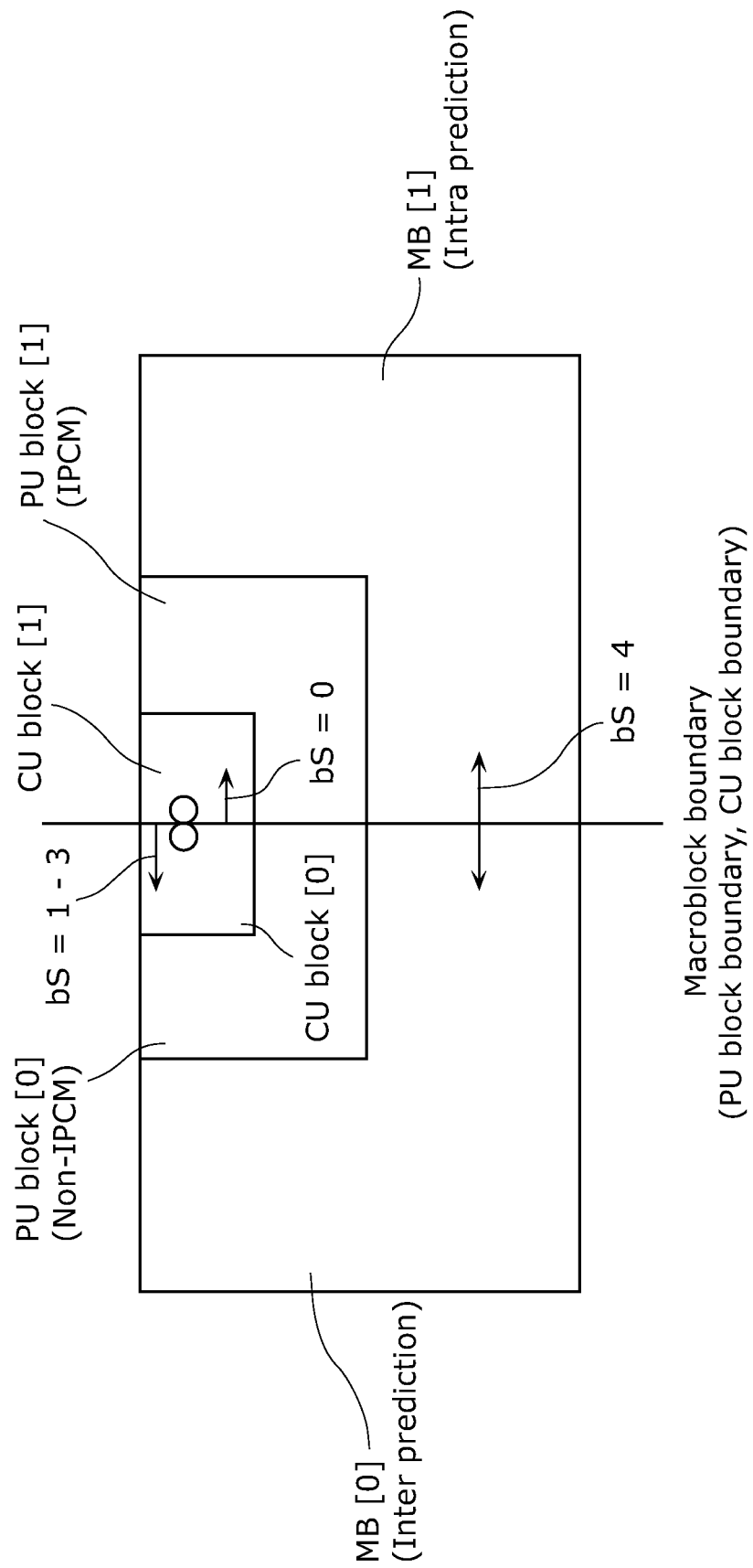
FIG. 13 is an illustration of filter strengths and block units according to Embodiment 1 of the present invention.

FIG. 13 is an illustration of filter strengths determined using the filtering method according to this embodiment and block units which define a boundary.

As shown in FIG. 13, when a macroblock MB [0] is a macroblock coded using the inter prediction mode and a macroblock MB [1] is a macroblock coded using the intra prediction mode (Yes in S122) and when both the first and second blocks are non-IPCM blocks (No in S401), bS=4 is set to both the blocks (S123).

On the other hand, when a PU block [0] is coded using a non-IPCM mode and a PU block [1] is coded using an IPCM mode, that is, when a CU block [0] is a non-IPCM block and a CU block [1] is an IPCM block (Yes in S401), bS=any one of 0 to 3 is set to each of the CU block [0] and CU block [1]. In this example, bS=0 is set to the CU block [1] that is an IPCM block, and bS=any one of 1 to 3 is set to the CU block [0] that is a non-IPCM block.

Figure 14A:
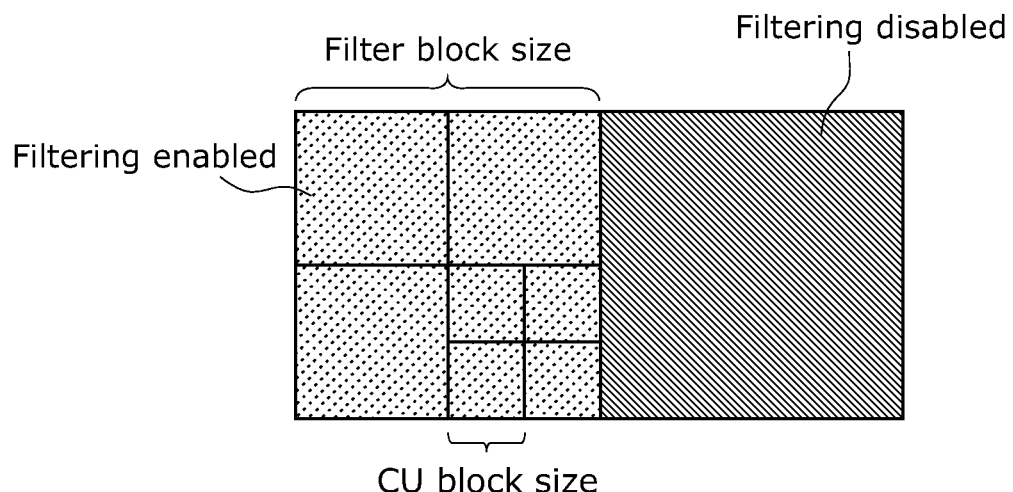
FIG. 14A is an illustration of an application range of a flag indicating that a filter is ON according to a comparison example in the present invention.
Figure 14B:
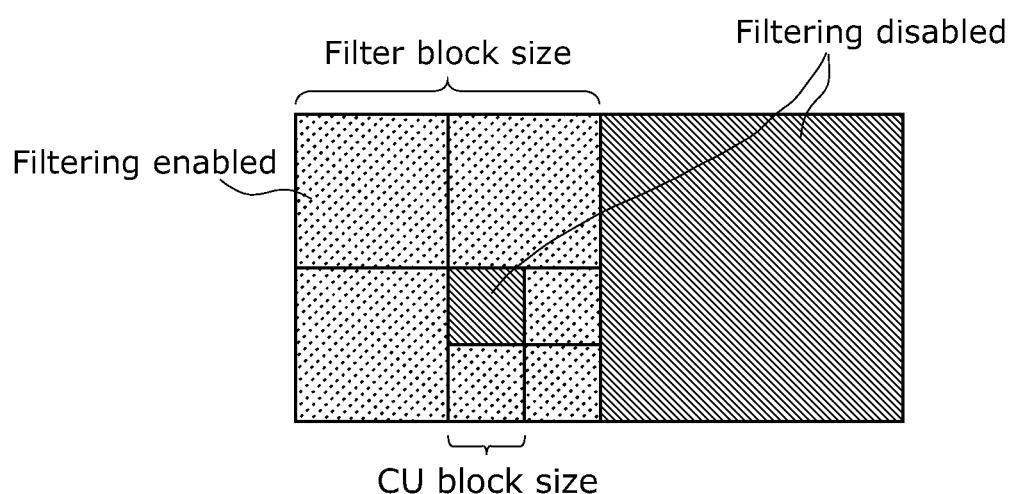
FIG. 14B is an illustration of an application range of a flag indicating that a filter is ON according to Embodiment 1 of the present invention.

Each of FIG. 14A and FIG. 14B is an illustration of a state in which an application range of a flag indicating that a filter is ON is extended by handling an IPCM block according to this embodiment. FIG. 14A shows, as a comparison example, a case of not applying an approach in this embodiment. FIG. 14B shows a case of applying the approach in this embodiment.

As shown in FIG. 14B, it is possible to extend the application range of the flag indicating that a filter is ON by using the filtering method according to this embodiment.

As described above, the filtering method according to this embodiment employs, for the determination, an implicit code interpretation rule that the filtering unit or the control unit "does not filter an IPCM block" in the in-loop filtering. In this way, as shown in FIG. 14A and FIG. 14B, it is possible to specify whether a filter is enabled or disabled for a coded string in a larger range. In this way, the filtering method according to this embodiment reduces the amount of bits.

The filtering methods, moving picture coding apparatuses, and moving picture decoding apparatuses according to the embodiments of the present invention have been described above, but the present invention is not limited to these embodiments.

For example, it is also possible to combine at least parts of functions of the filtering methods, moving picture coding apparatuses, moving picture decoding apparatuses according to the embodiments and the variations thereof.

In addition, the division of functional blocks in each of the block diagrams is exemplary. It is also possible to implement some of the functional blocks as a functional block, divide a functional block into plural blocks, and/or move part of the function(s) to any of the functional blocks. In addition, the functions of the plural functional blocks having functions similar to each other may be exerted in parallel or in time division by hardware or software.

In addition, the execution order of the plural steps of each of the filtering methods is provided as an example for specifically explaining the present invention, and thus other orders are also possible. In addition, part of the steps may be executed simultaneously with (in parallel to) any of the other steps.

For example, the order of Steps S201 and S202 shown in FIG. 5 is not limited to the described order. In other words, it is only necessary that Steps S204 and S205 are executed as a result when "one of two blocks across a boundary is included in an IPCM block, and the other is not included in an IPCM block". In addition, the order of Steps S204 and S205 may also be arbitrary.

Likewise, the order of Steps S222 to S225 shown in FIG. 11 is not limited to the described order. More specifically, the order of Steps S222 to S225 may be arbitrary as long as Step S224 is after Step S222 and Step S225 is after S223.

Embodiment 2

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 15:
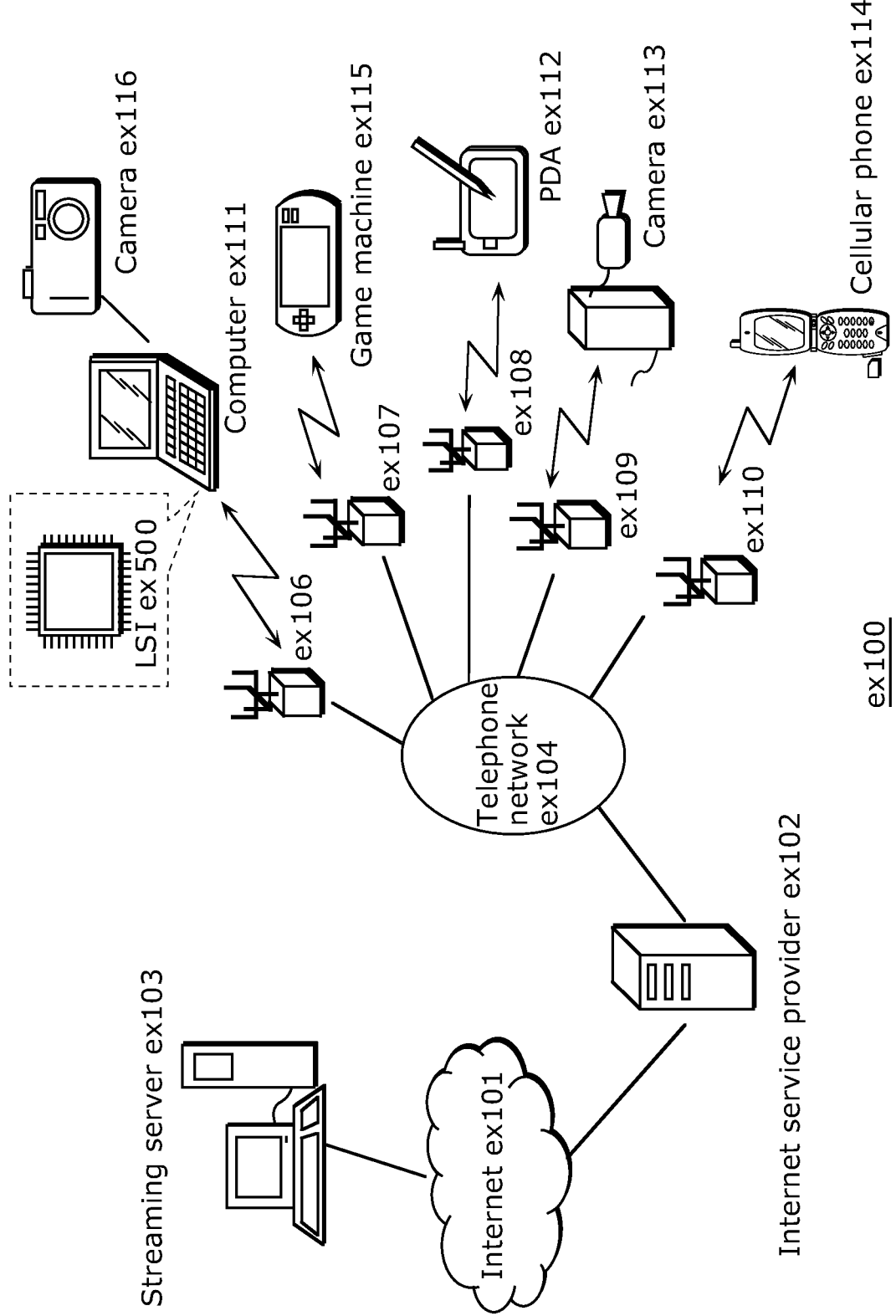
FIG. 15 shows an overall configuration of a content providing system for implementing content distribution services.

FIG. 15 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 15, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus in the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus in the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 16:
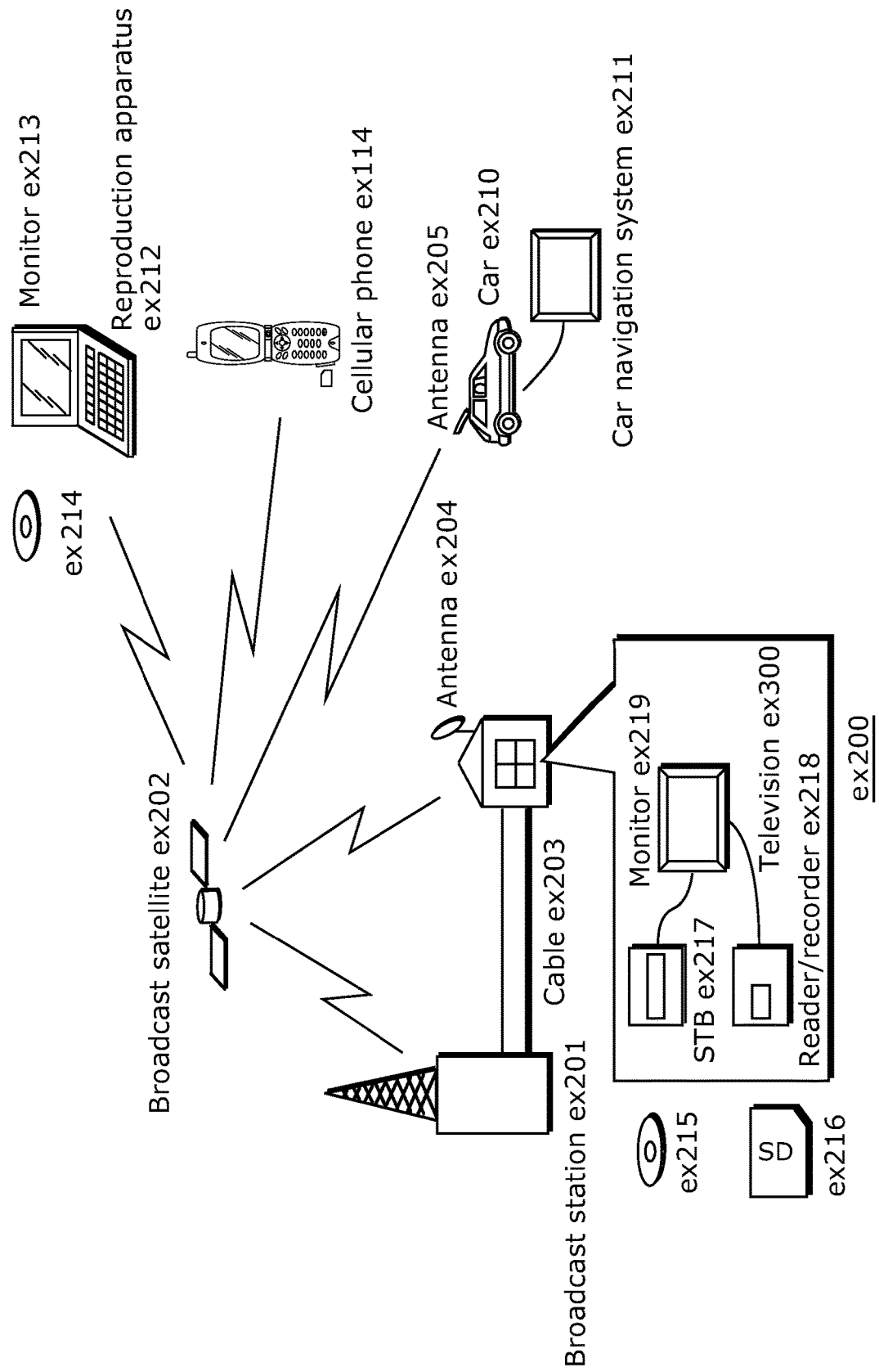
FIG. 16 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 16. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus in the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image coding apparatus in the present invention).

Furthermore, a reader/recorder ex218 (i) reads and decodes the multiplexed data recorded on a recording media ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 17:
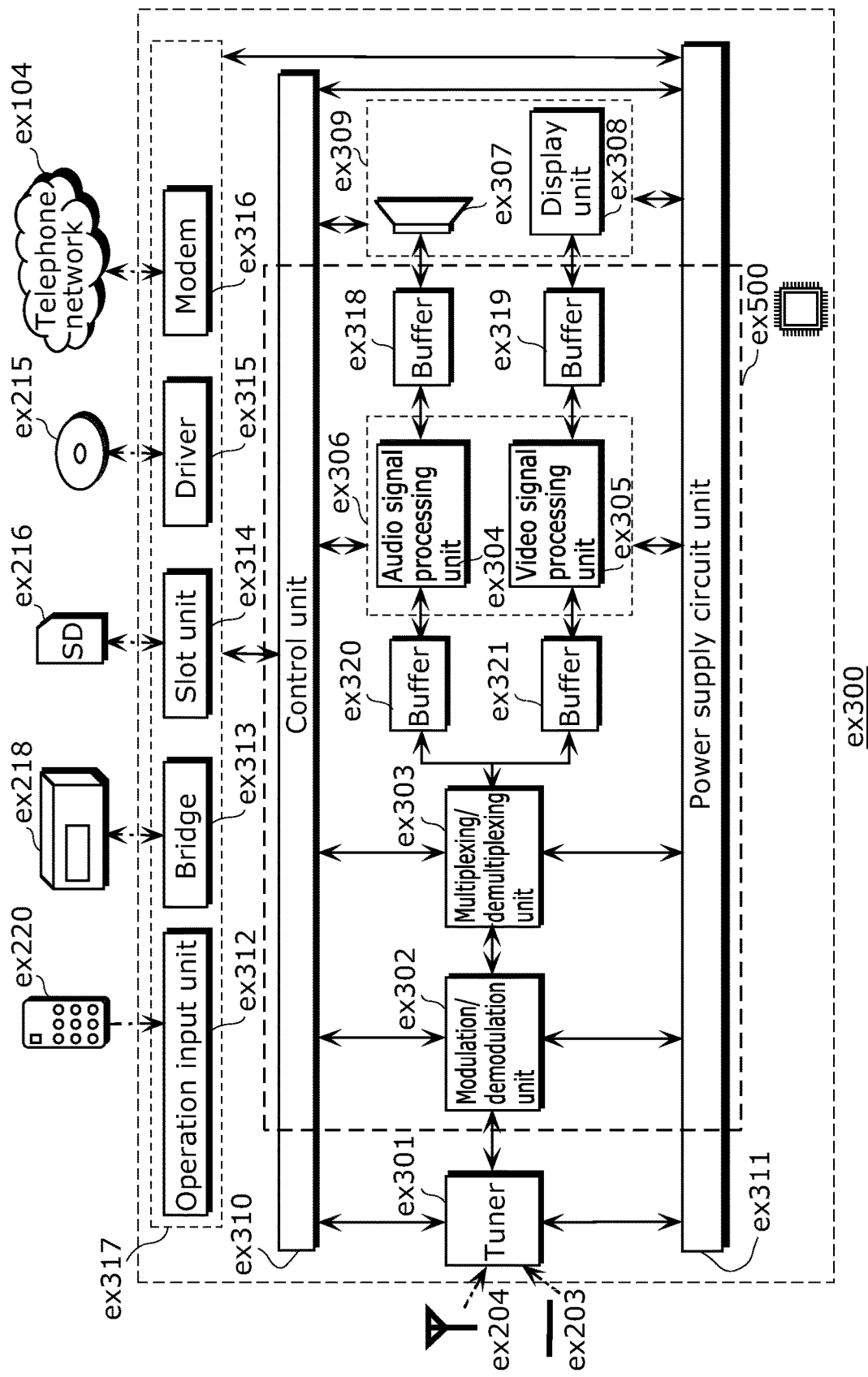
FIG. 17 shows a block diagram illustrating an example of a configuration of a television.

FIG. 17 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 18:
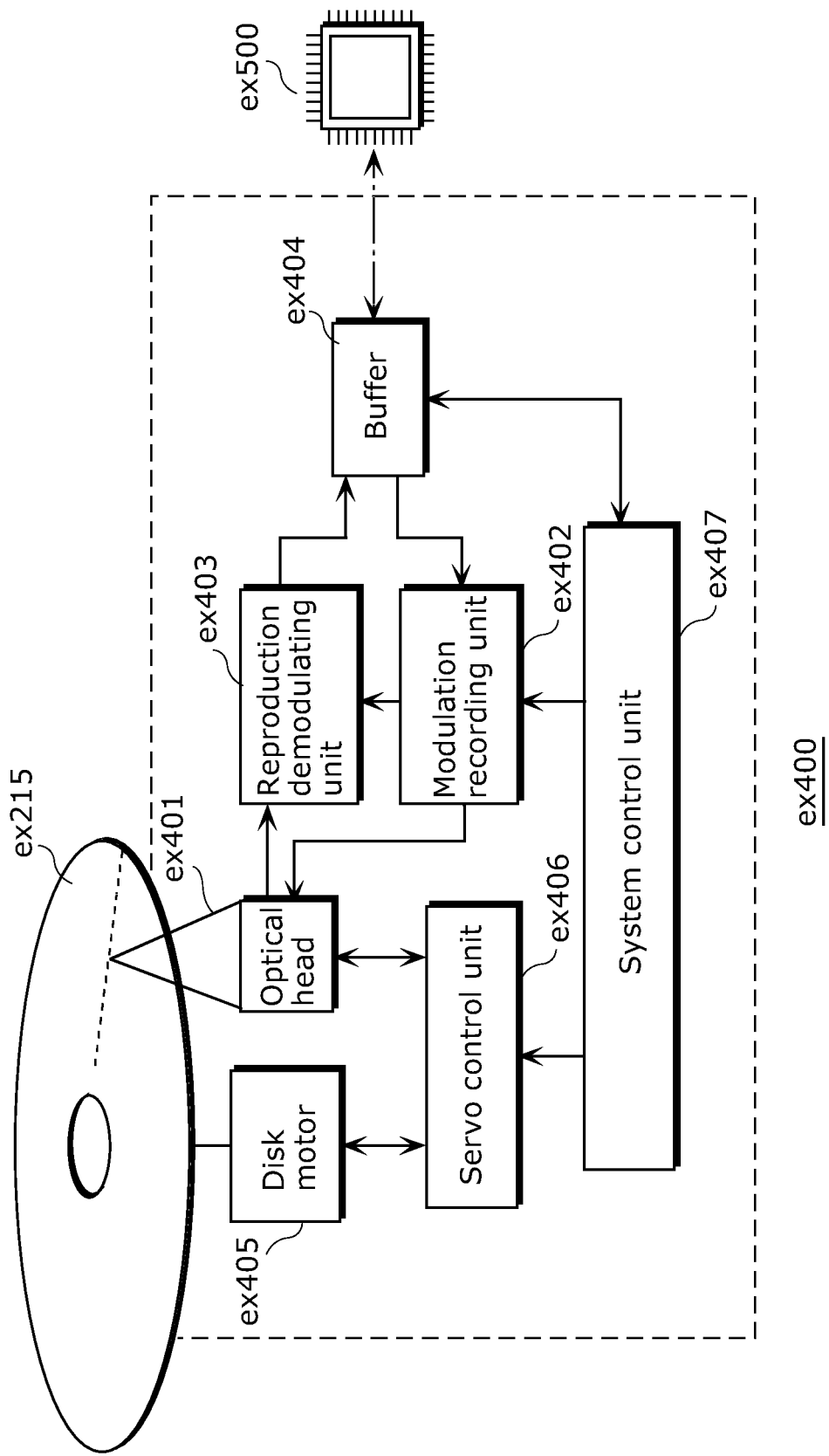
FIG. 18 shows a block diagram illustrating an example of a configuration of an information reproducing/recording unit that reads and writes information from and on a recording medium that is an optical disk.

As an example, FIG. 18 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 19:
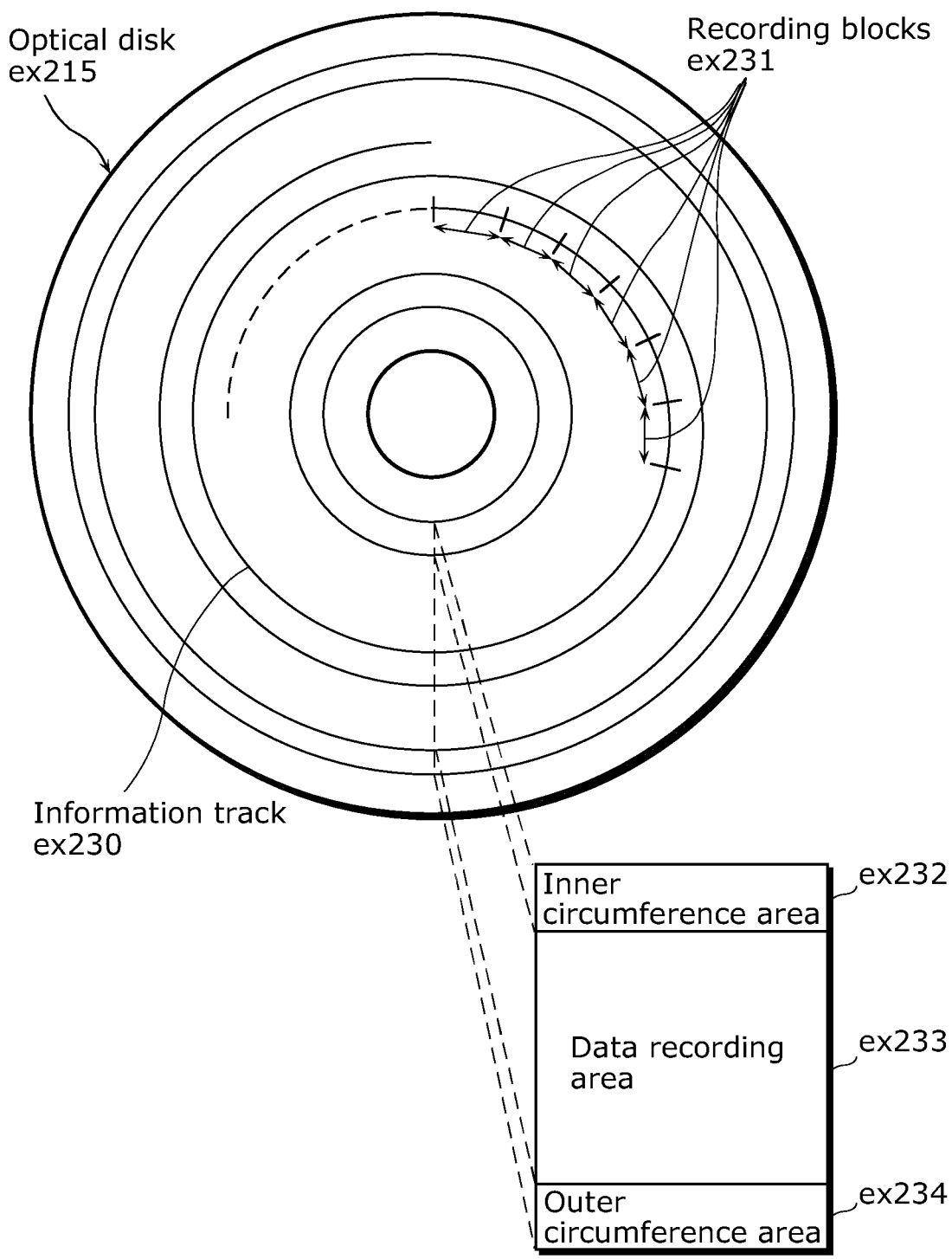
FIG. 19 shows an example of a configuration of a recording medium that is an optical disk.

FIG. 19 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 17. The same will be true for the configuration of the computer ex111, the cellular phone ex114, and others.

Figure 20A:
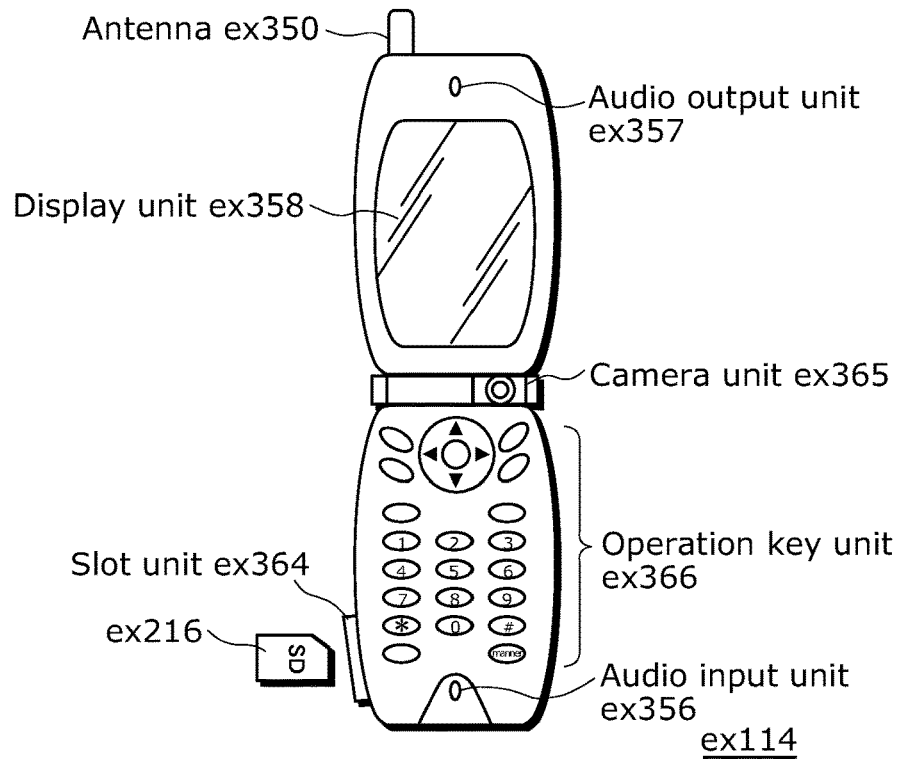
FIG. 20A shows an example of a cellular phone.

FIG. 20A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 20B:
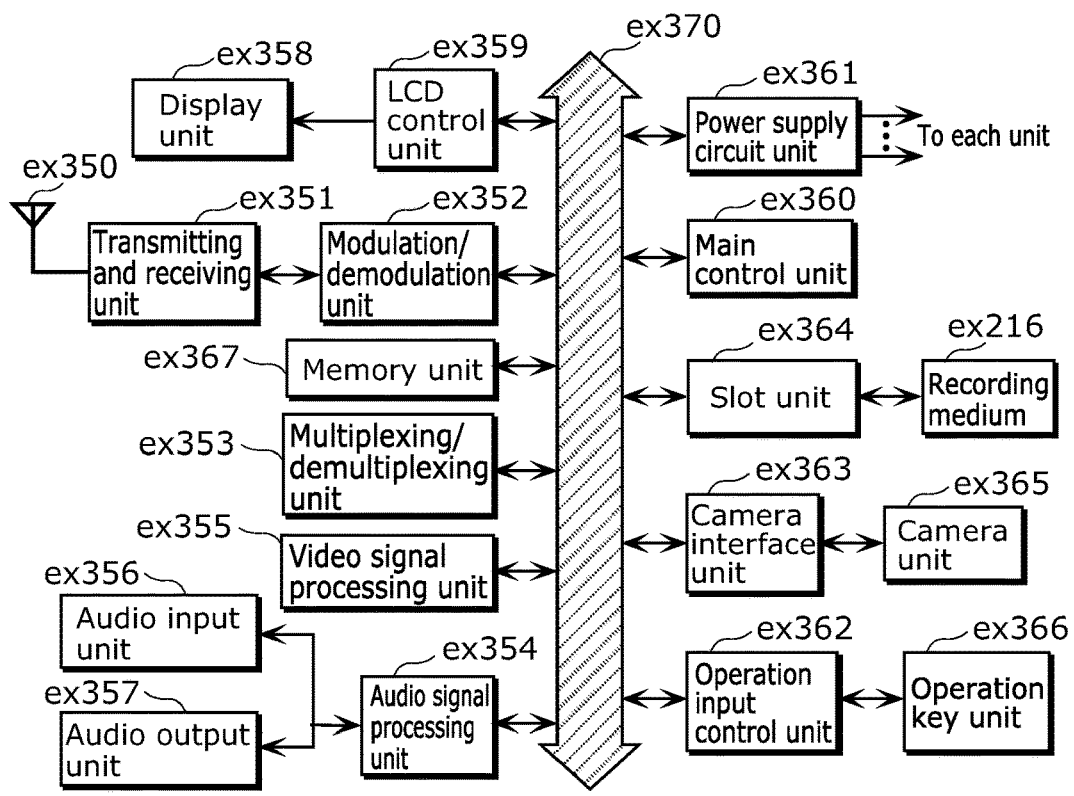
FIG. 20B is a block diagram showing an example of a configuration of a cellular phone.

Next, an example of a configuration of the cellular phone ex114 will be described with reference to FIG. 20B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus in the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus in the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 3

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 21 illustrates a structure of the multiplexed data. As illustrated in FIG. 21, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 22:
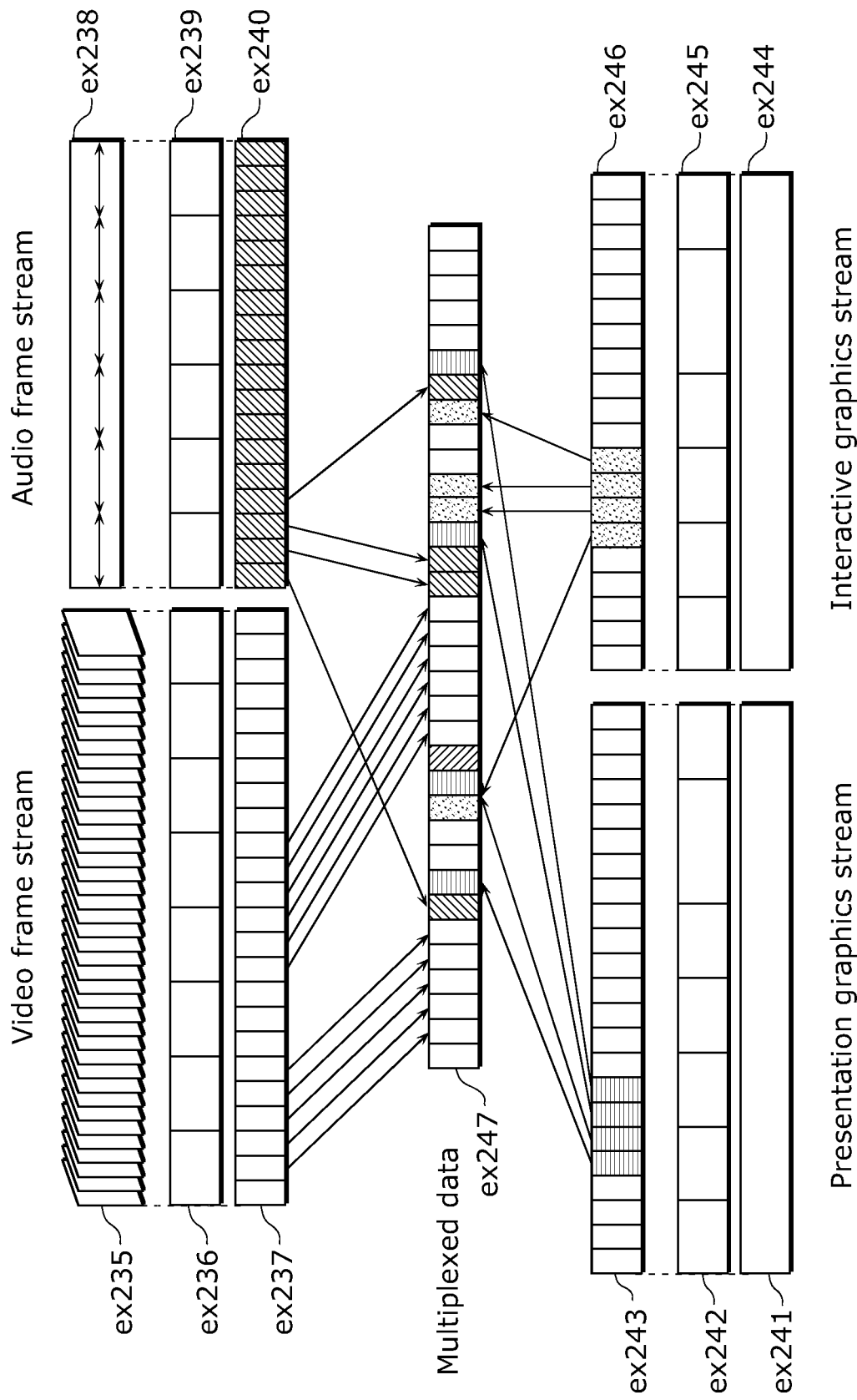
FIG. 22 schematically shows how each stream is multiplexed in multiplexed data.

FIG. 22 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 23:
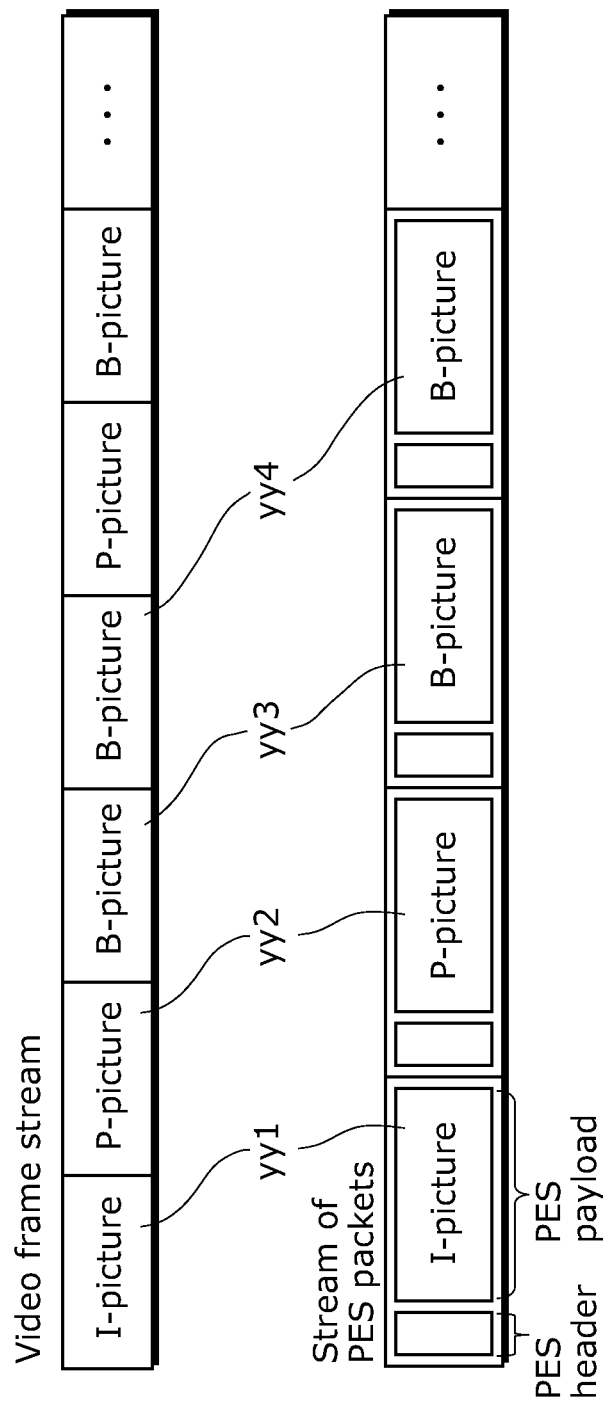
FIG. 23 shows how a video stream is stored in a stream of PES packets in more detail.

FIG. 23 illustrates how a video stream is stored in a stream of PES packets in more detail. The first bar in FIG. 23 shows a video frame stream in a video stream. The second bar shows the stream of PES packets. As indicated by arrows denoted as yy1, yy2, yy3, and yy4 in FIG. 23, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 24 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 24. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

FIG. 25 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 26:
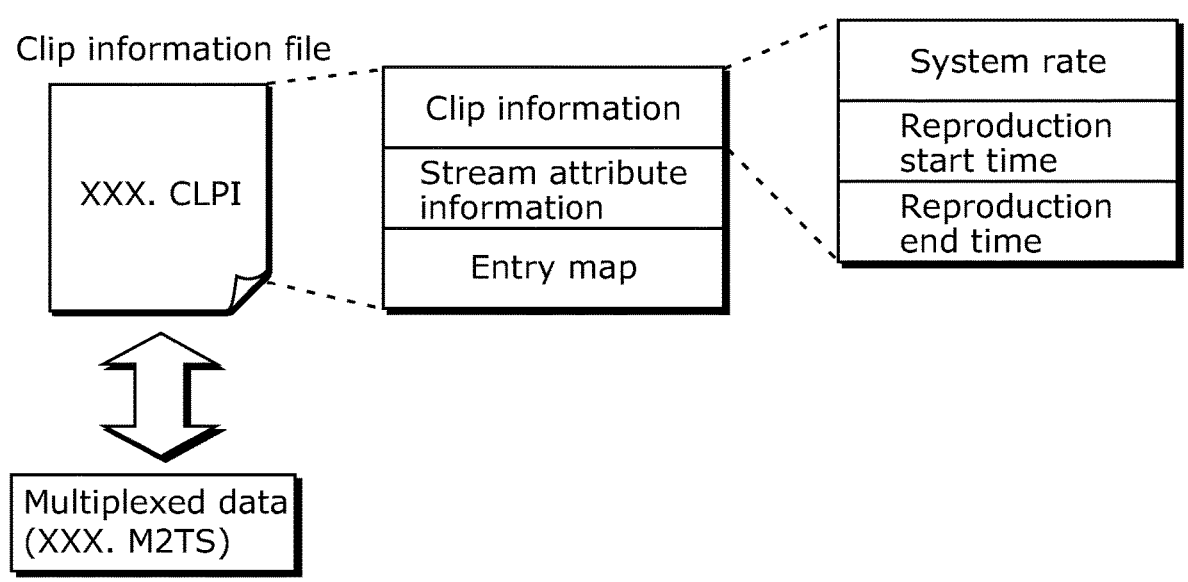
FIG. 26 shows an internal structure of multiplexed data information.

Each of the multiplexed data information files is management information of the multiplexed data as shown in FIG. 26. The multiplexed data information files are in one to one correspondence with the multiplexed data, and each of the files includes multiplexed data information, stream attribute information, and an entry map.

As illustrated in FIG. 26, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 27:
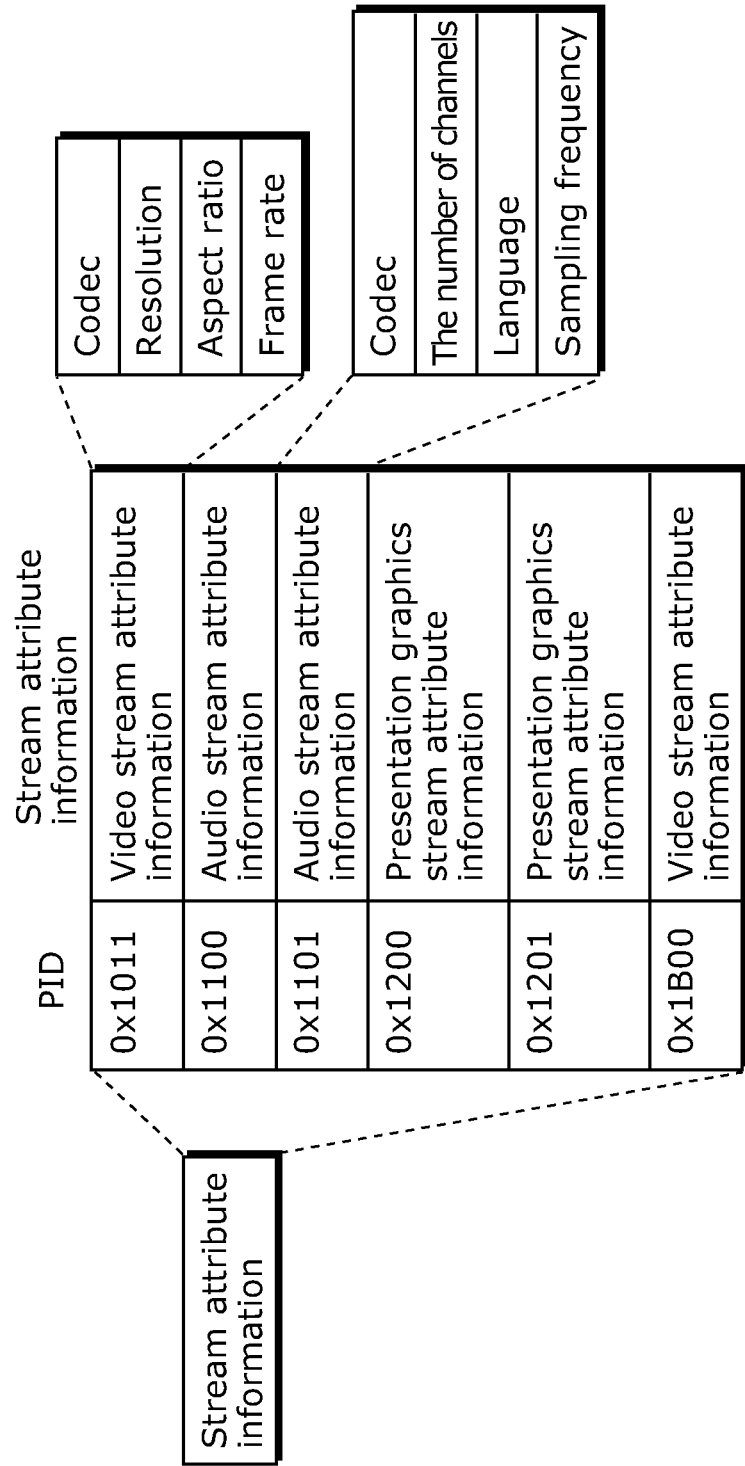
FIG. 27 shows an internal structure of stream attribute information.

As shown in FIG. 27, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 28:
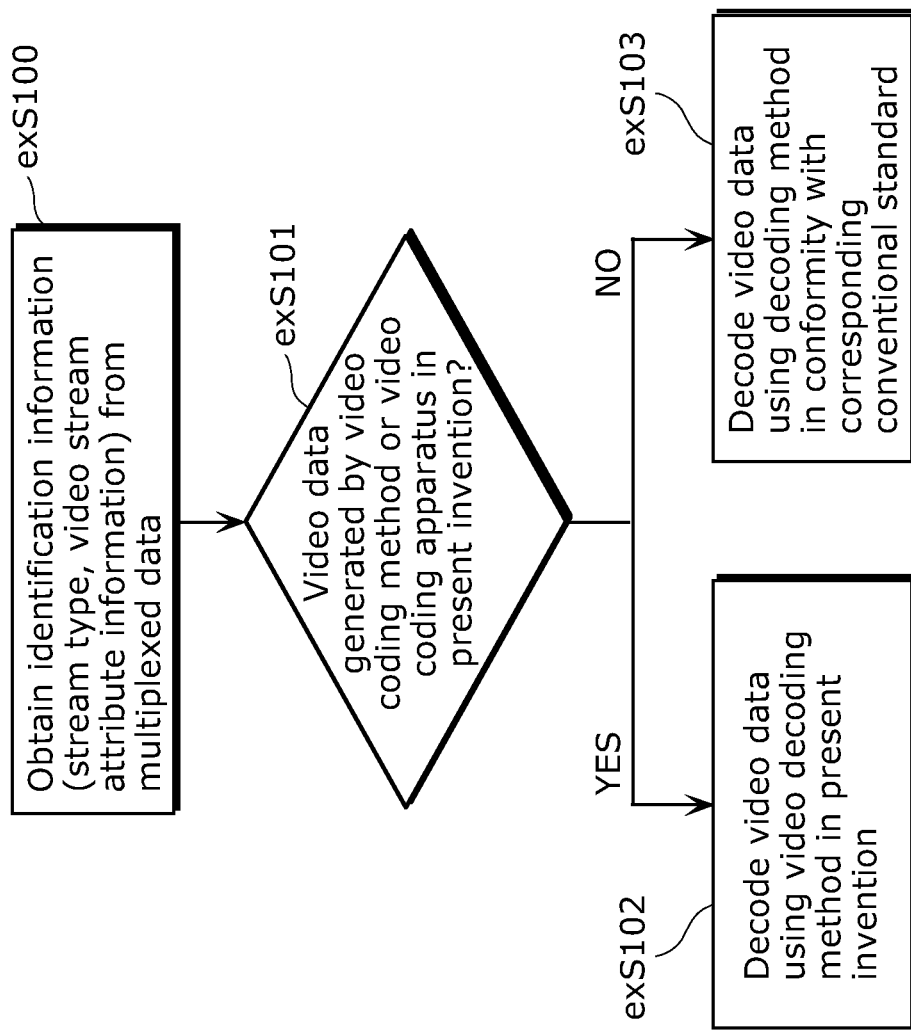
FIG. 28 shows steps for identifying video data.

Furthermore, FIG. 28 illustrates steps of the moving picture decoding method according to the present embodiment. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 4

Figure 29:
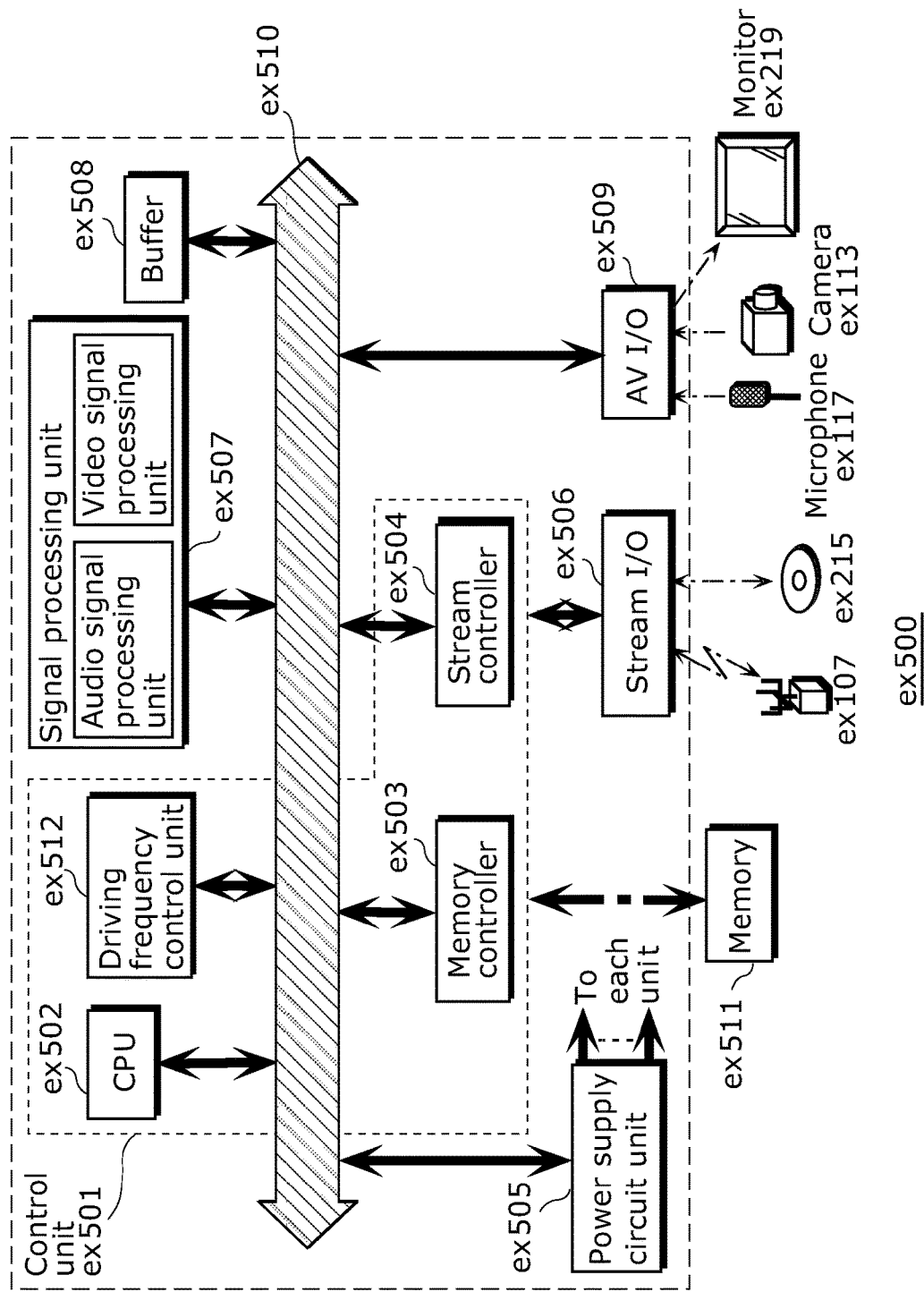
FIG. 29 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 29 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 5

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 30:
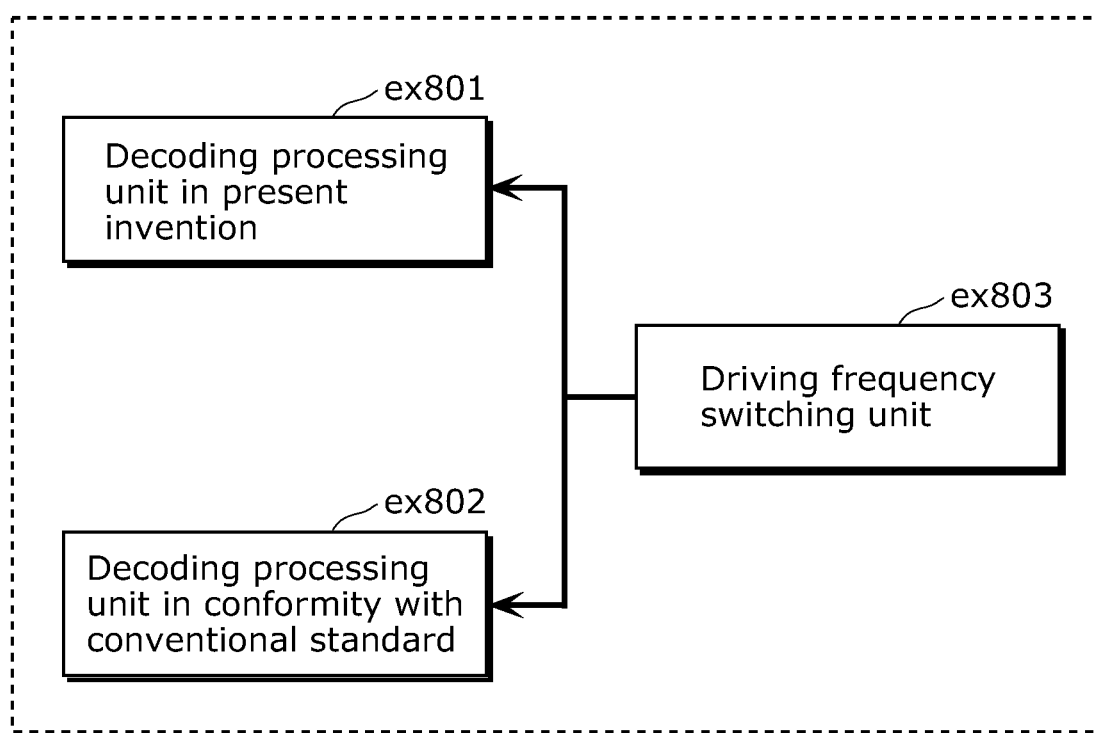
FIG. 30 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 30 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

Figures 31, 32:
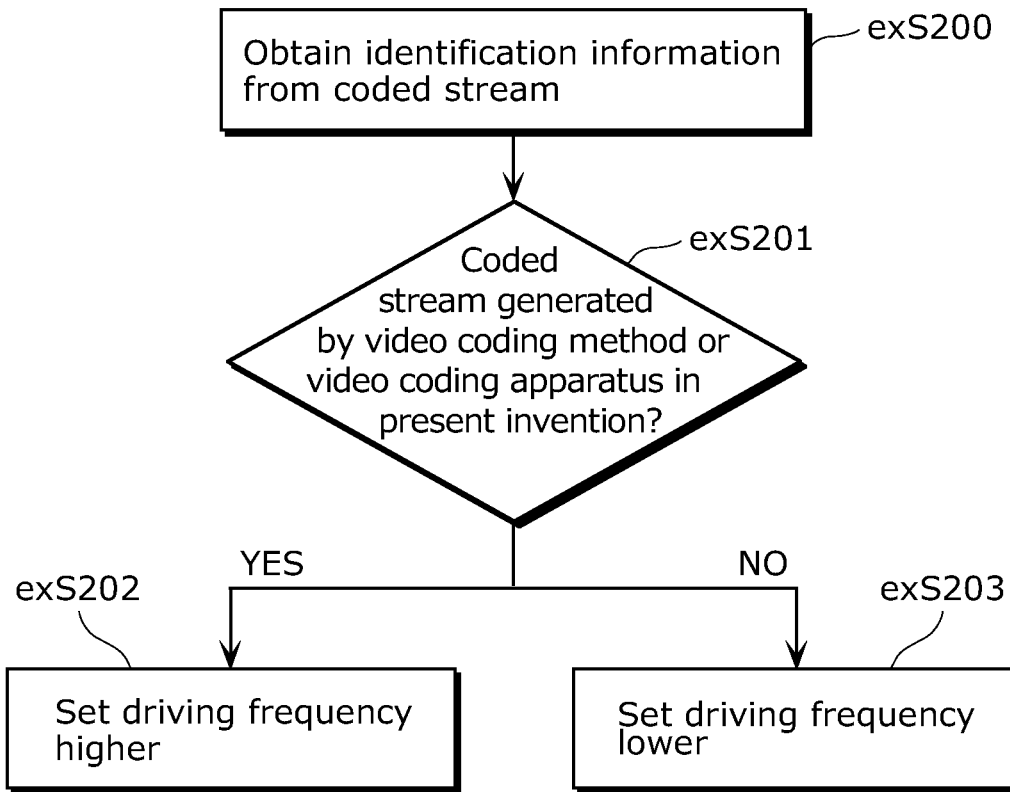
FIG. 31 shows steps for identifying video data and switching between driving frequencies.
FIG. 32 shows an example of a look-up table in which video data standards are associated with driving frequencies.

More specifically, the driving frequency switching unit ex803 includes the CPU ex502 and the driving frequency control unit ex512 in FIG. 29. Here, each of the decoding processing unit ex801 that executes the moving picture decoding method described in each of embodiments and the decoding processing unit ex802 that conforms to the conventional standard corresponds to the signal processing unit ex507 in FIG. 29. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 3 is probably used for identifying the video data. The identification information is not limited to the one described in Embodiment 3 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 32. The driving frequency can be selected by storing the look-up table in the buffer ex508 and in an internal memory of an LSI, and with reference to the look-up table by the CPU ex502.

FIG. 31 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of Embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 6

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 33A:
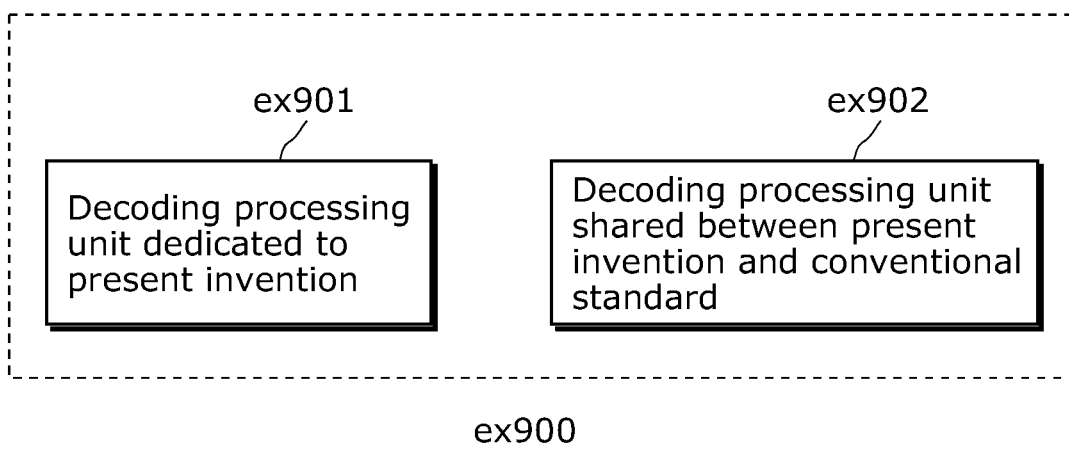
FIG. 33A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 33A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to the present invention. Since the present invention is characterized by intra prediction processing in particular, for example, the dedicated decoding processing unit ex901 is used for intra prediction processing. Otherwise, the decoding processing unit is probably shared for one of the entropy coding, inverse quantization, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 33B:
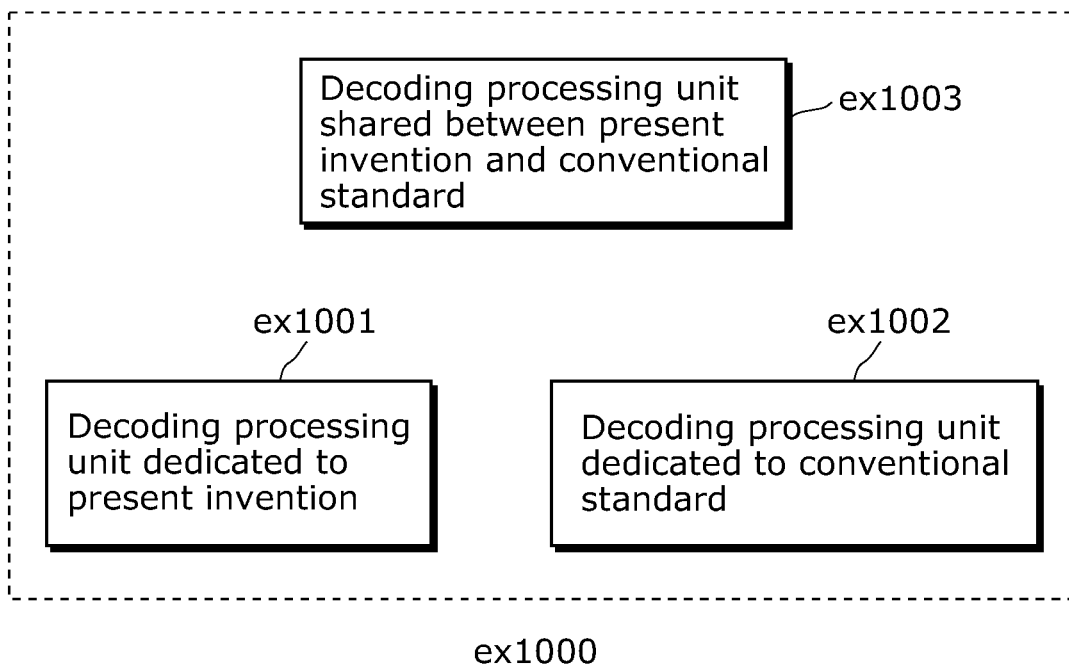
FIG. 33B is a diagram showing another example of a configuration for sharing a module of the signal processing unit.

Furthermore, ex1000 in FIG. 33B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the moving picture decoding method in the present invention and the conventional moving picture decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method in the present invention and the moving picture decoding method in conformity with the conventional standard.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is applicable to filtering methods, moving picture coding apparatuses, and moving picture decoding apparatuses. For example, the present invention is applicable to high-definition image display apparatuses and image capturing apparatuses such as television receivers, digital video recorders, car navigation systems, digital cameras, and digital video cameras.

The invention claimed is:

1. An encoding method for encoding an image partitioned into a plurality of blocks including a first block and a second block, the encoding method comprising:
    determining (i) whether both of the first block and the second block are non-IPCM blocks; (ii) whether both of the first block and the second block are IPCM blocks; or (iii) whether one of the first block and the second block is an IPCM block and the other of the first block and the second block is a non-IPCM block;
    when it is determined in said determining that the first block is a non-IPCM block and the second block is an IPCM block, generating a reconstructed image,
    wherein the generating comprises:
        performing prediction on the first block to generate a prediction block;
        transforming and quantizing a residual image block that represents a difference between the first block and the prediction block to generate a residual block;
        inverse transforming and inverse quantizing the residual block to generate a reconstructed residual image block;
        adding the reconstructed residual image block with the prediction block to generate a reconstructed first block, wherein prediction and transformation are performed on the first block, and prediction and transformation are not performed on the second block; and
        filtering the reconstructed first block and the second block included in the image to generate filtered data, using values of pixels respectively included in the reconstructed first block and the second block,
        wherein the reconstructed image includes (i) a part of the filtered data generated in the filtering as the pixels in the reconstructed first block and (ii) unfiltered pixels in the second block, instead of a part of the filtered data generated in the filtering, as the pixels in the second block,
        wherein in the filtering, a fixed value is not used as a quantization parameter of the second block, and
        wherein the filtering is performed using the quantization parameter of the second block.

2. An encoding apparatus which encodes an image partitioned into a plurality of blocks including a first block and a second block, the encoding apparatus comprising:
    a determining unit configured to determine (i) whether both of the first block and the second block are non-IPCM blocks; (ii) whether both of the first block and the second block are IPCM blocks; or (iii) whether one of the first block and the second block is an IPCM block and the other of the first block and the second block is a non-IPCM block; and
    a generating unit configured to generate a reconstructed image when it is determined by said determining unit that the first block is a non-IPCM block and the second block is an IPCM block,
    wherein the generating unit comprises:
        a prediction unit configured to perform prediction on the first block to generate a prediction block;
        a transforming and quantizing unit configured to transform and quantize a residual image block that represents a difference between the first block and the prediction block to generate a residual block;
        an inverse transforming and quantizing unit configured to inverse transform and inverse quantize the residual block to generate a reconstructed residual image block;
        an adding unit configured to add the reconstructed residual image block with the prediction block to generate a reconstructed first block, wherein prediction and transformation are performed on the first block, and prediction and transformation are not performed on the second block; and
        a filtering unit configured to filter the reconstructed first block and the second block included in the image to generate filtered data, using values of pixels respectively included in the reconstructed first block and the second block,
        wherein the reconstructed image includes (i) a part of the filtered data generated by the filtering unit as the pixels in the reconstructed first block and (ii) unfiltered pixels in the second block, instead of a part of the filtered data generated by the filtering unit, as the pixels in the second block,
        wherein the filtering unit does not use a fixed value as a quantization parameter of the second block, and
        wherein the filtering unit performs the filtering using the quantization parameter of the second block.

3. An encoding apparatus which encodes an image partitioned into a plurality of blocks including a first block and a second block, the encoding apparatus comprising:
    processing circuitry; and
    storage coupled to the processing circuitry,
    wherein the processing circuitry performs the following using the storage:
        determining (i) whether both of the first block and the second block are non-IPCM blocks; (ii) whether both of the first block and the second block are IPCM blocks; or (iii) whether one of the first block and the second block is an IPCM block and the other of the first block and the second block is a non-IPCM block;
        when it is determined in said determining that the first block is a non-IPCM block and the second block is an IPCM block, generating a reconstructed image,
        wherein the generating comprises:
            performing prediction on the first block to generate a prediction block;

transforming and quantizing a residual image block that represents a difference between the first block and the prediction block to generate a residual block;

inverse transforming and inverse quantizing the residual block to generate a reconstructed residual image block;

adding the reconstructed residual image block with the prediction block to generate a reconstructed first block, wherein prediction and transformation are performed on the first block, and prediction and transformation are not performed on the second block; and filtering the reconstructed first block and the second block included in the image to generate filtered data, using values of pixels respectively included in the reconstructed first block and the second block, wherein the reconstructed image includes (i) a part of the filtered data generated in the filtering as the pixels in the reconstructed first block and (ii) unfiltered pixels in the second block, instead of a part of the filtered data generated in the filtering, as the pixels in the second block, wherein in the filtering, a fixed value is not used as a quantization parameter of the second block, and wherein the filtering is performed using the quantization parameter of the second block.

* * * * *